(12) United States Patent
Ito

(10) Patent No.: US 8,016,425 B2
(45) Date of Patent: Sep. 13, 2011

(54) PROJECTOR

(75) Inventor: Yoshitaka Ito, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 899 days.

(21) Appl. No.: 12/020,753

(22) Filed: Jan. 28, 2008

(65) Prior Publication Data

US 2008/0180640 A1 Jul. 31, 2008

(30) Foreign Application Priority Data

Jan. 29, 2007 (JP) ................. 2007-017504

(51) Int. Cl.
*G03B 21/00* (2006.01)

(52) U.S. Cl. .............. 353/31; 353/34; 348/751

(58) Field of Classification Search .......... 353/31, 353/84, 122, 34; 348/742, 743, 751
See application file for complete search history.

(56) References Cited

U.S. PATENT DOCUMENTS

| | | | | |
|---|---|---|---|---|
| 6,018,374 | A * | 1/2000 | Wrobleski | 348/744 |
| 6,597,409 | B1 | 7/2003 | Shioya et al. | |
| 6,736,514 | B2 | 5/2004 | Horvath et al. | |
| 6,742,901 | B2 * | 6/2004 | Kimura et al. | 353/122 |
| 6,809,792 | B1 * | 10/2004 | Tehranchi et al. | 352/85 |
| 6,811,267 | B1 * | 11/2004 | Allen et al. | 353/122 |
| 7,057,811 | B2 * | 6/2006 | Bruegl et al. | 359/443 |
| 7,218,754 | B2 * | 5/2007 | Schumann et al. | 382/100 |
| 7,293,880 | B2 | 11/2007 | Sakata et al. | |
| 7,377,651 | B2 * | 5/2008 | Belliveau | 353/30 |
| 7,559,670 | B2 * | 7/2009 | Belliveau | 362/233 |
| 2003/0095236 | A1 * | 5/2003 | Itoh | 353/20 |
| 2004/0141153 | A1 * | 7/2004 | Itoh | 353/20 |
| 2004/0145708 | A1 * | 7/2004 | Tanner et al. | 353/94 |
| 2004/0150794 | A1 * | 8/2004 | Kurtz et al. | 353/31 |
| 2005/0140942 | A1 * | 6/2005 | Squires et al. | 353/122 |
| 2006/0262280 | A1 * | 11/2006 | Duffield et al. | 353/46 |
| 2006/0291014 | A1 | 12/2006 | Hirata et al. | |
| 2008/0158521 | A1 * | 7/2008 | Belliveau | 353/84 |
| 2008/0180640 | A1 * | 7/2008 | Ito | 353/31 |

(Continued)

FOREIGN PATENT DOCUMENTS

JP A 07-270911 10/1995

(Continued)

OTHER PUBLICATIONS

Shirai et al., "Presenting Information on Real Environments with IR Projector", *Information Processing Technology Letters* (FIT2003), vol. 2, pp. 287-289 (2003).

*Primary Examiner* — John Lee
(74) *Attorney, Agent, or Firm* — Oliff & Berridge, PLC

(57) ABSTRACT

A projector includes: a light source which emits light containing visible light and infrared light; a light time division unit which divides light emitted from the light source into one or more visible lights having different wavelength ranges and one or more infrared lights having different wavelength ranges in a time-division manner; a light modulation element which time-sequentially modulates the plural lights separated by the light time division unit and having different wavelength ranges; and a projection unit which projects and displays the light modulated by the light modulation element on a projection-receiving surface. A plurality of images containing a visible image produced by the one or more visible lights and an infrared image produced by the one or more infrared lights are displayed on the same projection receiving surface.

13 Claims, 15 Drawing Sheets

U.S. PATENT DOCUMENTS

| | | | |
|---|---|---|---|
| 2009/0096994 A1* | 4/2009 | Smits | 353/30 |
| 2009/0180079 A1* | 7/2009 | Oakley | 353/31 |
| 2010/0033683 A1* | 2/2010 | Reichow et al. | 353/30 |
| 2010/0110308 A1* | 5/2010 | Nicholson et al. | 348/744 |

FOREIGN PATENT DOCUMENTS

| | | |
|---|---|---|
| JP | A 2000-284361 | 10/2000 |
| JP | A 2004-086159 | 3/2004 |
| JP | A 2005-017583 | 1/2005 |
| JP | A-2005-62748 | 3/2005 |
| JP | A 2005-227695 | 8/2005 |
| JP | A 2005-321524 | 11/2005 |
| JP | A 2006-301300 | 11/2006 |
| JP | A-2007-10807 | 1/2007 |
| JP | A-2007-17516 | 1/2007 |
| WO | WO 2006/028459 A1 | 3/2006 |

\* cited by examiner

PROJECTOR

BACKGROUND

1. Technical Field

The present invention relates to a projector and more particularly to a projector capable of displaying both visible image and infrared image on a screen.

2. Related Art

A projector which displays an enlarged optical image on a screen as image information created by using an optical modulation element has high adjustability to digital equipment such as a computer. Thus, this type of projector has been widely used for the purpose of presentation, information, showing pictures, and other purposes. Since the chief function of a general display apparatus including a projector is to provide some implicational information for a person, image information to be displayed is generally given as a visible image which is visible to human eyes. Accordingly, a typical projector selects visible light from light emitted from a light source, and displays an image by using the selected visible light as illumination light.

For displaying implicational information for the purpose of presentation or information, it is considered that the volume of information appropriate for display is limited from the viewpoints of visibility, readability, receivability of information, and other points. When excessive volume of information is on display at a time, a person cannot receive information with sufficient accuracy just as a case where he or she has difficulty in obtaining necessary information in a busy shopping area of a city crowded with signboards. In this case, there is even a tendency that he or she pays no attention to respective information.

In case of presentation or picture showing, security is also required for an image to be displayed. Shooting and using presentation information or picture information for other purposes without permission of the person having copyright of the information has been currently a serious social problem.

For overcoming these problems, a technology for controlling display information (image and picture) by using infrared light invisible to human eyes has be under development. An image displayed by infrared light (infrared image) cannot be visible to humans, but the display contents of the image can be recognized by using an image shooting element which has sensitivity throughout the infrared range such as a CCD and a CMOS sensor. According to a technology disclosed in *Proposal of information Presentation Method in Actual Environment Using IR Projector*, information Processing Technology Letters (FIT2003), Vol. 2, pp. 287-289, 2003, written by Yoshinari Shirai and Mitsunori Matsushita, (see FIG. 1), for example, a method for controlling information (image and picture) to be displayed by using a combination of an ordinary visual light projector which displays visual color images and an infrared light projector which displays images by infrared light is proposed. More specifically, information to be provided for an unspecified number of persons such as information about the presence of the information and the outline of the information is displayed as a visible image, and information to be provided only for a person requiring more detailed information is displayed as an infrared image. The invisible infrared image is observed via an image shooting element such as a digital camera.

In view of security for a display image, U.S. Pat. No. 6,018,374 proposes a method for preventing sneak shot or the like by providing notification that shooting without permission of the person having the copyright is an illegal act, for example. According to this method, an infrared projector overlaps and projects an infrared image on an image projected on a screen. When an image shooting element such as digital video and digital camera shoots the image projected on the screen, the shot image contains the infrared image.

As described in the above references, the method of overlapping and displaying the invisible infrared image on the visible image shown on the screen is effective for controlling display image (image and picture) and preventing illegal acts such as sneak shot. In this method, however, an additional second projector for projecting an infrared image is required as well as a projector for projecting and displaying original information. Considering that the number of portable projector is increasing as a result of size reduction of projector, addition of the second projector lowers portability. Moreover, the display positions of the two projectors during display need to be accurately matched. In this case, the projection display positions of the two projectors need to be accurately matched every time the projectors are moved. However, particularly for the infrared projector which projects invisible infrared images, the display position cannot be visually controlled. Accordingly, freedom of installation and easiness of use extremely lower.

SUMMARY

It is an advantage of some aspects of the invention to provide an easy and portable projector capable of overlapping and displaying both a visible color image and invisible infrared image on one projection surface such that display image (image and picture) can be controlled particularly by one system.

A projector according to a first aspect of the invention includes: a light source which emits light containing visible light and infrared light; a light time division unit which divides light emitted from the light source into one or more visible lights having different wavelength ranges and one or more infrared lights having different wavelength ranges in a time-division manner; a light modulation element which time-sequentially modulates the plural lights separated by the light time division unit and having different wavelength ranges; and a projection unit which projects and displays the light modulated by the light modulation element on a projection-receiving surface. A plurality of images containing a visible image produced by the one or more visible lights and an infrared image produced by the one or more infrared lights are displayed on the same projection receiving surface.

A projector according to a second aspect of the invention includes: a plurality of light sources having a first light source which emits light containing visible light and a second light source which emits light containing infrared light; a light time division unit which divides light emitted from at least either the first light source or the second light source into plural lights having different wavelength ranges in a time-division manner; a source light combining unit which spatially combines light emitted from the first light source and light emitted from the second light as combined light; a light modulation element which modulates the light combined by the source light combining unit; and a projection unit which projects and displays the light modulated by the light modulation element on a projection-receiving surface. A plurality of images containing a visible image produced by the light containing visible light and an infrared image produced by the light containing infrared light are displayed on the same projection receiving surface.

A projector according to a third aspect of the invention includes: a plurality of Sight sources which have a first light source for emitting light containing visible light and a second light source for emitting light containing infrared light such that lights can be time-sequentially emitted from the respective light sources; a light modulation element which time-sequentially modulates the plural lights time-sequentially emitted from the first light source and the second light source; and a projection unit which projects and displays the light modulated by the light modulation element on a projection receiving surface. A plurality of images containing a visible image produced by the light containing visible light and an infrared image produced by the light containing infrared light are displayed on the same projection receiving surface.

A projector according to a fourth aspect of the invention includes: a light source which emits light containing visible light and infrared light; a light time division unit which divides light from the light source into plural lights containing one or more visible lights having different wavelength ranges and one or more infrared lights having different wavelength ranges in a time division manner; a light space division unit which divides light from the light source into plural lights containing one or more visible lights having different wavelength ranges and one or more infrared lights having different wavelength ranges in a space division manner; a plurality of light modulation elements each of which is provided on the corresponding one of the optical paths of the lights divided by the light space division unit to time-sequentially modulate the plural lights divided by the light time division unit; a modulation light combining unit which spatially combines the plural lights modulated by the plural light modulation elements into one combined light; and a projection unit which projects and displays the light combined by the modulation light combining unit on a projection receiving surface. A plurality of images containing a visible image produced by the one or more visible lights and an infrared image produced by the one or more infrared lights are displayed on the same projection receiving surface.

A projector according to a fifth aspect of the invention includes a plurality of light sources which have a first light source for emitting light containing visible light and a second light source for emitting light containing infrared light; a light time division unit which divides light from at least either the first light source or the second light source into plural having different wavelength ranges in a time division manner; a plurality of light modulation elements each of which is provided on the corresponding one of the optical paths of the lights emitted from the first light source and the second light source to time-sequentially modulate the plural lights divided by the light time division unit; a modulation light combining unit which spatially combines the plural lights modulated by the plural light modulation elements into one combined light; and a projection unit which projects and displays the light combined by the modulation light combining unit on a projection receiving surface. A plurality of images containing a visible image produced by the light containing visible light and an infrared image produced by the light containing a infrared light are displayed on the same projection receiving surface.

A projector according to a sixth aspect of the invention includes: a plurality of light sources which have a first light source for emitting light containing visible light and a second light source for emitting light containing infrared light such that the lights are time-sequentially emitted from the respective light sources; a plurality of light modulation elements which have a first light modulation element for time-sequentially modulating a part of plural lights time-sequentially emitted from the first light source and the second light source, and a second light modulation element for time-sequentially modulating the remaining part of the plural lights; a modulation light combining unit which spatially combines the plural lights modulated by the plural light modulation elements into one combined light; and a projection unit which projects and displays the light combined by the modulation light combining unit on a projection receiving surface. A plurality of images containing a visible image produced by the light containing visible light and an infrared image produced by the light containing infrared light are displayed on the same projection receiving surface.

According to the structures of the projectors of the first through Sixth aspects of the invention, the display conditions of the visible color image and the invisible infrared image can be separately controlled, and both the images can be displayed on one projection receiving surface such that the positions of the images can be accurately matched. Thus, the display information (image and picture) can be controlled. Moreover, the visible image and the infrared image can be displayed by the one projector. In this case, the necessity for matching the display positions of the visible image and the infrared image is eliminated even when the projector is moved, and therefore easiness of use considerably increases. Furthermore, the overall compactness of the display system increases portability of the system.

Each of the projectors according to the first through sixth aspects of the invention can be classified according to the structure of the light source, the structure of the light modulation element, the presence or absence of the light time division unit, and the like. The projector according to the first aspect of the invention has the light source for emitting light containing visible light and infrared light (white light source, for example) and the one light modulation element. The projector according to the second aspect of the invention has the plural light sources which have the first light source for emitting light containing visible light and the second light source for emitting light containing infrared light, the one light modulation element, and the light time division unit. The projector according to the third aspect of the invention has the plural light sources which have the first light source for emitting light containing visible light and the second light source for emitting light containing infrared light such that lights can be time-sequentially emitted, and the one light modulation element, but does not have the light time division unit. The projector according to the fourth aspect of the invention has the light source for emitting light containing visible light and infrared light (white light source, for example), and the plural light modulation elements. The projector according to the fifth aspect of the invention has the plural light sources which have the first light source for emitting light containing visible light and the second light source for emitting light containing infrared light, the plural light modulation elements, and the light time division unit. The projector according to the sixth aspect of the invention has the plural light sources which have the first light source for emitting light containing visible light and the second light source for emitting light containing infrared light such that lights can be time-sequentially emitted, and the plural light modulation elements, but does not have the light time division unit.

The common characteristics of the projectors according to the first through sixth aspects of the invention are that the light modulation element for time-sequentially modulating plural lights, that is, a so-called time-division driving type light modulation element is used. Each of the projectors according to the first through third aspects of the invention in the above six projectors uses one time-division driving type light modulation element. Thus, the optical structure is simplified and, the cost is reduced. Each of the projectors according to the fourth through sixth aspects of the invention uses plural time-division driving type light modulation elements, and thus can lower the frame frequency of one light modulation element. Accordingly, a light modulation element whose response speed is slow can be employed. In addition, the frame frequency of each light modulation element can be lowered even in case of low intensity of infrared light emitted from the light source, and thus the display time of sub-frame can be prolonged. Accordingly, the intensity of infrared light can be increased, and image shooting and image detection by an image shooting element can be easily achieved. On the contrary, when the frame frequency is not lowered, the types of infrared light allowing modulation can be increased. Thus, various controls over display information can be performed. In case of the projectors according to the second, third, fifth, and sixth aspects of the invention which use plural light sources, the intensity of infrared light can be easily increased.

It is preferable that one of the plural light modulation elements is a light modulation element for infrared light which modulates the infrared light, and that the remaining light modulation element of the plural light modulation elements is a light modulation element for visible light which modulates the visible light in the projectors according to the fourth through sixth aspects of the invention.

According to this structure, the display conditions of the visible color image and the invisible infrared image can be separately controlled with ease.

It is preferable that both the light modulation element for infrared light and the light modulation element for visible light have the same image display range size and resolution.

According to this structure, the resolutions of the visible color image and the invisible infrared image can be matched, and display with correspondence between one pixel of the visible image and one pixel of the infrared image can be easily produced. Accordingly, detailed control over display information to a local data level within the image can be performed. Moreover, Since the necessity for preparing various types of light modulation element having different specifications is eliminated, the cost of the projector can be easily reduced.

It is preferable that the distance (L) between the light modulation element for visible light and the projection unit is different from the distance (LIR) between the light modulation element for infrared light and the projection unit. More specifically, it is preferable that the relation L<LIR holds.

When a lens is used as the projection unit, for example, the refractive index of lens material constituting the lens has wavelength dependency. Thus, there is a high possibility that optical aberration such as color aberration is produced. However, even when the focal distance of the projection unit has wavelength dependency, general on of optical aberration between the visible images or between the visible image and the infrared image can be easily reduced by setting the distance between the light modulation element for visible light and the projection at a length different from the distance between the light modulation element for infrared light and the projection unit in this case, lowering of resolution can be reduced and image quality of the display image can be enhanced by matching the focal positions of the respective display images (preventing out-of-focus). In case of the structure including the plural light modulation elements for visible light, the distance between the light modulation element for visible light and the projection unit can be varied for each light modulation element.

As an alternative method for increasing image quality by preventing generation of color aberration, a medium having a large Abbe number (low wavelength dependency of refractive index) may be used for the prism. An anomalous disperse medium (glass) having special wavelength dependency of refractive index may be appropriately used from a similar viewpoint.

It is preferable that a polarizing element provided on the liquid crystal light valve is a light reflection type polarizing element or a light absorbing type polarizing element containing metal when the light modulation element for infrared light has a liquid crystal light valve.

When the light modulation element for infrared light is a liquid crystal light valve, polarizing elements are needed on the light entrance side and light exit side of the liquid crystal light valve. However, when infrared light is applied to the light modulation element and the polarizing element, the light modulation element and the polarizing element are more easily heated than when visible light is applied thereto. In this case, deterioration of the light modulation element and the polarizing element is easily caused. However, when a light reflection type polarizing element which absorbs only a small quantity of light is used, heat generation can be reduced. Alternatively, a light absorbing type polarizing element containing metal which is not easily deteriorated by heat generation can be appropriately used in this structure.

It is possible that the light modulation elements for visible light and for infrared light have any one of a transmission type liquid crystal light valve, a reflection type liquid crystal light valve, and a small mirror array element.

Particularly the light modulation element for infrared light is easily heated when infrared light is applied thereto. Thus the structure using the reflection type element such as reflection type liquid crystal light valve and small mirror array element capable of easily reducing heat effect is appropriately employed.

It is preferable to further include a function of displaying a marker which indicates the display condition of the infrared light on the projection receiving surface. Alternatively, it is preferable to further include an indicator which indicates the display condition of the infrared light on the main body of the projector.

According to these structures, whether the infrared image which cannot be visually recognized by human eyes is being displayed or not can be easily judged by the viewer or the user of the projector without using an image shooting element such as a camera.

BRIEF DESCRIPTION OF THE DRAWINGS

The invention will be described with reference to the accompanying drawings, wherein like reference numbers are given to like elements.

DESCRIPTION OF EXEMPLARY EMBODIMENTS

First Embodiment

A first embodiment according to the invention hereinafter described with reference to FIGS. 1 and 2A through 2D.

In this embodiment, an example of a liquid crystal projector which includes one light source and one transmission type liquid crystal, light valve is discussed.

Figure 1:
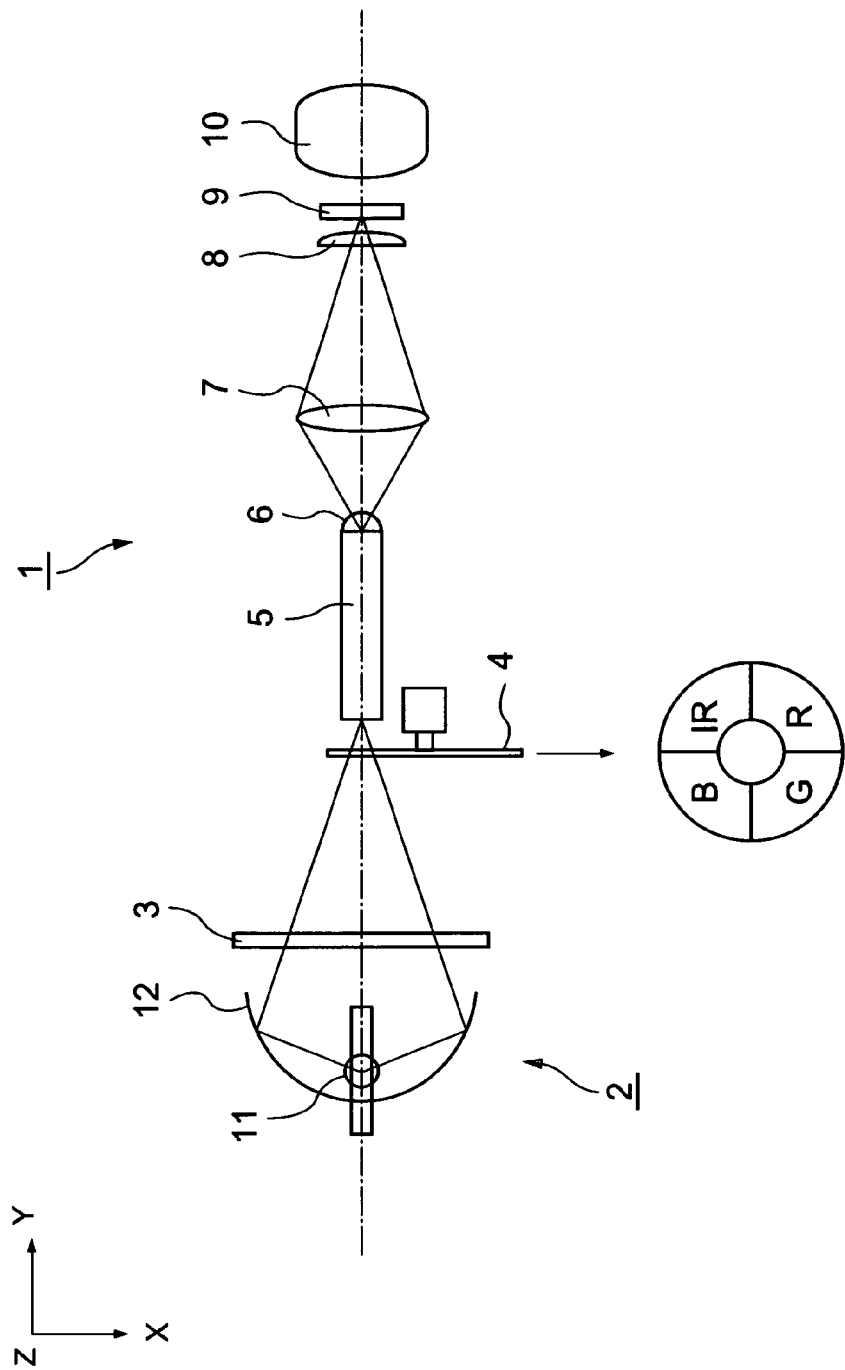
FIG. 1 schematically illustrates a structure of a projector according to a first embodiment of the invention.
Figure 2A:
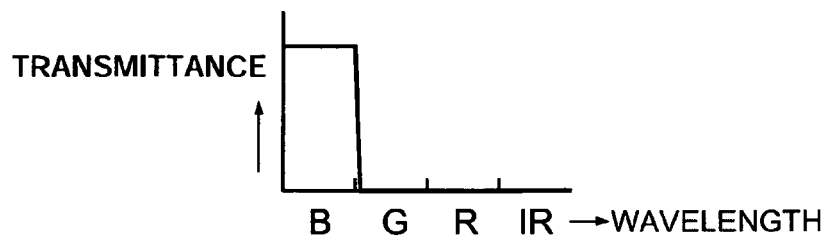
FIGS. 2A through 2D show spectral characteristics of a rotational color filter included in the projector shouts in FIG. 1.
Figure 2B:
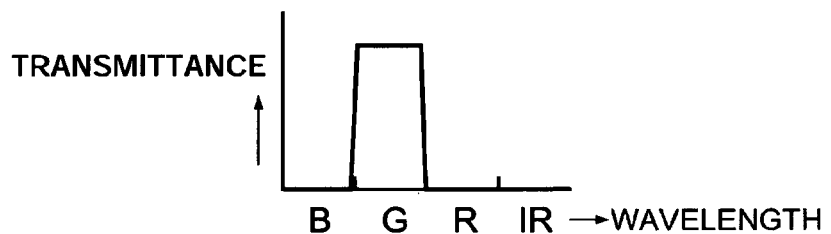
Figure 2C:
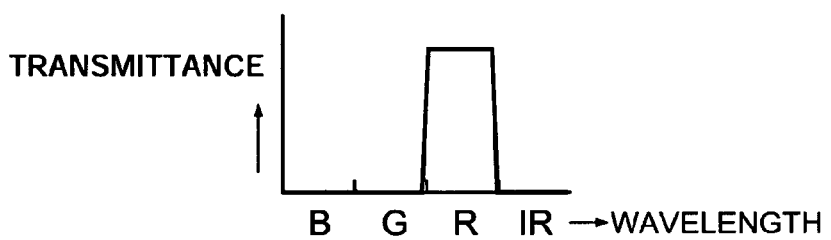
Figure 2D:
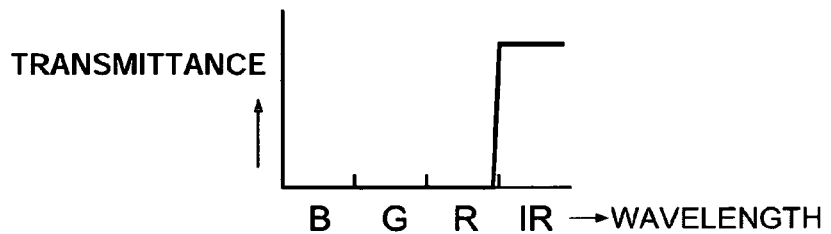

FIG. 1 schematically illustrates a structure of the project or according to this embodiment and FIGS. 2A through 2D show spectral characteristics of a rotational color filter used in the projector.

It should be noted that the size and positional relations contained in the respective figures are different for each figure for clearly showing the respective components.

As illustrated in FIG. 1, a projector 1 according to this embodiment generally includes a light source 2, an ultraviolet light cut filter 3, a rotational color filter 4 (light time division unit) a rod integrator 5, relay lenses 6, 7 and 8, a transmission type liquid crystal light valve 9 (light modulation element, hereinafter abbreviated as liquid crystal light valve in some cases), and a projection lens 10 (projection unit). The light source 2 is a light source capable of emitting light containing visible light and infrared light. More specifically, the light source may be formed by a lamp capable of emitting light containing white light and infrared light such as high pressure mercury lamp, metal halide lamp, xenon lamp, halogen lamp and other lamps. Alternatively, the light source may be an organic EL element, an inorganic EL element, or an FED capable of emitting white light as well as a lamp. Illumination light emitted from a lamp 11 is converged by a reflector 12 and enters the ultraviolet light cut filter 3. Then, unnecessary ultraviolet light is removed from the illumination light by the ultraviolet light cut filter 3.

Light released from the ultraviolet light cut filter 3 enters the rotational color filter 4. The rotational color filter 4 has four color filters having different transmission wavelength ranges and substantially the same area as shown in FIGS. 2A through 2D. The light having entered the rotational color filter 4 is successively divided into visible lights of blue light (B light), green light (G light), and red light (R light) and infrared light (IR light) having different wavelength ranges in a time-division manner. The rotational color filter 4 rotates once in 1/60 second (driven at 60 Hz). Thus, light released substantially every 1/240 second successively changes to different color light in the order of B light, G light, R light, and IR light, and returns to B light. The respective lights after time-division then pass through the rod integrator 5, the relay lenses 6, 7, and 8, and enter the time-division driving type liquid crystal light valve.

According to this embodiment, it is assumed that the blue light having a wavelength range from about 380 nm to about 495 nm, the green light having a wavelength range from about 495 nm to about 585 nm, the red light having a wavelength range from about 585 nm to about 720 nm, and the infrared light having a wavelength range from about 720 nm to 1100 nm are used as an example. It is considered that the visibility wavelength range of human eyes is generally from 380 to 780 nm. In fact, human eyes lose almost all visual sensitivity to light having a wavelength of 720 nm or higher. The sensitivity limit of an Si photo-sensor as a typical image shooting element (image pick-up device) is approximately 1100 nm.

The respective lights after time-division sequentially enter the time-division driving type liquid crystal light valve 9, where the lights are modulated according to information inputted from outside and successively released as modulated lights containing image information (of course, image data in the liquid crystal light valve 9 is rewritten for each 1/240 second). While the structure shown in FIG. 1 includes a homogenizing illumination system (illumination distribution homogenizing unit) using the rod integrator 5 and a relay lens system, the structure may further include other systems such as polarization conversion illumination system.

Though not shown in the figure, a pair of polarizing elements are provided on the light entrance side and exit side of the liquid crystal light valve 9. The polarizing elements control the polarization condition of light passing through the liquid crystal light valve 9 and convert the phase information of modulated light into intensity information to form a display image. For the liquid crystal light valve 9 into which infrared light enters as modulated light, it is preferable that a light reflection type polarizing element absorbing only a small amount of light (limited to the light entrance side in this example), or a light absorbing troupe polarizing element containing metal particles and having high heat resistance (allowed to be equipped on both the light entrance and exit sides in this example) are provided. In this case, deterioration of the polarizing elements and the liquid crystal light valve 9 due to generated heat can be prevented, and images having high contrast can be formed. Specific examples of the light reflection type polarization element are wire grid polarization element formed by cyclically disposing metal wires with a small pitch, and a DBEF plate (product name: manufactured by Sumitomo Three M, Ltd. formed by cyclically laminating two types of transparent materials having different double refractive indexes with a small pitch. On the other hand, a specific example of the light absorbing type polarization element is a polar core (product name: manufactured by Coning Corp.) formed by orienting metal particles having shape anisotropy.

The modulated light containing image information and released from the liquid crystal light valve 9 is projected on the not-shown screen via the projection lens 10. The projected blue light, green light, red light, and infrared light are visually recognized as a visible color image on which an infrared image is superimposed without time division due to visual characteristics of human eyes.

Since the refractive indexes of glass material and plastic resin have wavelength dependency, such a phenomenon that the focal distance (focal position) of the projection lens 10 made of either one of these materials differs according to wavelength is caused (optical aberration). As a result, out-of-focus of the display image, resolution decrease, color blurring, and the like are caused, and therefore the image quality lowers. According to the projector 1 in this embodiment, it is possible to reduce generation of optical aberration by using a number of glass materials having different dispersion characteristics similarly to an ordinary projector for displaying only visible images. Examples of particularly effective methods are to use medium having a large Abbe number (having refractive index with small wavelength dependency), use anomalous dispersion material having refractive index whose wavelength dependency has special characteristics, or other methods. Alternatively, an optical element for correcting wavelength dependency of refractive index may be provided between the liquid crystal light valve 9 and the projection lens 10.

The projector 1 according to this embodiment has a function of showing a marker in a visible image for indicating that an infrared image is currently being displayed at an inconspicuous position such as the peripheral area of the visible image during the period of infrared image display. By this function, the viewer or the operator of the projector can easily judge whether the infrared image invisible to human eyes is being displayed without using an image shooting element such as a camera. It is possible to equip an indicator or the like for indicating that the infrared image is being displayed on the projector main body instead of the display of marker in the visible image.

An infrared image is not visible to human eyes, but can be recognized through a camera provided with an image shooting element such as CCD and CMOS sensor, an infrared camera, or other devices. Thus, by displaying a rough image as a visible image and detailed image associated with the rough image as infrared image, both sufficient volume of information and sufficient level of visibility can be achieved. Moreover, when information contained in the infrared image is associated with information for accessing the information source on the network (such as URL or IP address), detailed information can be easily obtained only by shooting the infrared image using a portable terminal unit equipped with a camera which is connectable with the network.

When the projector 1 according to this embodiment capable of overlapping an invisible infrared image with a visible color image for each pixel and displaying the overlapped image is used as discussed above, detailed association between these images and sufficient display control can be achieved. Moreover, the projector 1 according to this embodiment cuts and separates the wavelength such that the wavelength range of visible light does not overlap with the wavelength range of infrared light. Thus, the visible image can be accurately cut and separated from the infrared image by using a camera having a light filter corresponding to the cut-off wavelengths of both lights, and therefore only one of the images can be selectively observed.

According to the projector 1 in this embodiment described above, the display conditions of the visible color image and, the invisible infrared image can be separately controlled, and both the images can be accurately overlapped and displayed on one screen for the control of the display information (image and picture). Since superimposing display of the visible image and infrared image can be achieved by the single projector, the necessity for matching the display positions of the visible image and infrared image is eliminated even when the projector is moved. Thus, the projector can be more easily used. Moreover, the compactness of the overall size of the display system increases portability of the system.

While the projector 1 according to this embodiment displays images by using one type of infrared light, two or more types of infrared image having different wavelength ranges may be separately displayed. In this case, further various controls over the display image are performed. Obviously, such a structure is needed which can separately modulate five or more types of lights (such as blue light, green light, red light, and two or more infrared lights) by using the liquid crystal light valve 9 with increased duty ratio of the time-division driving. According to this structure, a sentence displayed on a visible image can be translated into two languages and displayed thereon. When the translated sentences are displayed as infrared images having different wavelength ranges for each language, the viewer can obtain only necessary translation. Thus, both the sufficient volume of information and sufficient level of visibility can be achieved.

According to this embodiment, the rotational color filter 4 has four color filters having substantially the same area, and respective lights having different wavelength ranges are released for every $1/240$ second. However, the emission time of the respective lights may be varied by changing the respective areas of the color filters. It is necessary, of course, to increase the speed of rewriting the image data in the liquid crystal light valve 9 in correspondence with the color filter having the minimum area. Particularly when the intensity of the infrared light contained in the light emitted from the light source 2 is low, the intensity of the infrared light can be supplemented by widening the area of the color filter emitting the infrared light to an area larger than the areas of the other color titers.

Second Embodiment

A second embodiment according to the invention is now described with reference to FIG. 3.

The basic structure of a projector according to this embodiment is substantially equivalent to that of the projector in the first embodiment shown in FIG. 1, but is different in that a reflection type liquid crystal light valve is used in lieu of the transmission type liquid crystal light valve used in the first embodiment.

Figure 3:
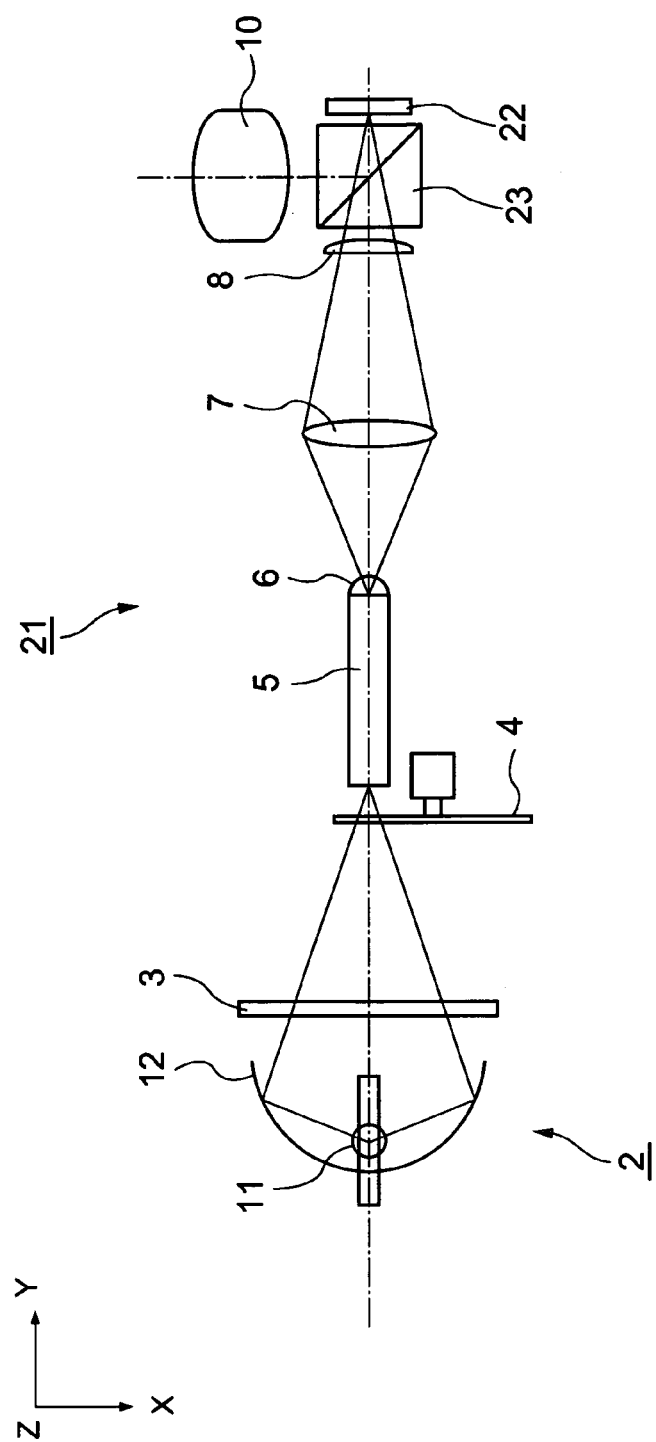
FIG. 3 schematically illustrates a structure of a projector according to a second embodiment of the invention.

FIG. 3 schematically illustrates the structure of the projector according to this embodiment. In FIG. 3, similar reference numbers are given to components common to those used in the first embodiment in FIG. 1, and detailed explanation of those components is not repeated.

According to a projector 21 in this embodiment illustrated in FIG. 3, a polarized beam splitter PBS) prism 23 is provided between the relay lens 8 and reflection type liquid crystal light valve 22 light modulation element, hereinafter abbreviated as liquid crystal light valve in some cases). The PBS prism 23 selectively divides particular polarized light according to the polarization condition of light. More specifically, when P-polarized light enters the liquid crystal light valve 22 after passing through the PBS prism 23, the liquid crystal light valve 22 converts the polarization condition of the light based on information inputted from outside (for example, converted from polarized light into S-polarized light) to input the image information to the light, Thus, the P-polarized light having entered the liquid crystal light valve 22 is partially converted into S-polarized light according to the image information. The light released from the liquid crystal light valve 22 again enters the PBS prism 23, and is selectively separated according to the polarization condition. Then, only light having polarization condition corresponding to the image information (S-polarized light) enters the projection lens 10.

Similarly to the above embodiment, the projector 21 according to this embodiment can accurately overlap a visible color image and invisible infrared image on one screen. Thus, the necessity for matching the display positions of the visible image and the infrared image is eliminated, and easiness of use is enhanced. Moreover, the compactness of the display system increases portability of the system. Accordingly, advantages similar to those in the first embodiment can be offered according to this embodiment.

In addition, the reflection type liquid crystal light valve generally having high-speed responsiveness is appropriate for a projector including time-division display type light modulation element which produces a visible image overlapped with an infrared image through successive display of monochromatic images.

Polarizing elements may be provided on both the relay lens 8 side entrance portion and the projection lens 10 side exit portion of the PBS prism 23 so as to increase polarization separation by the PBS prism 23. It is particularly preferable to use a reflection type polarizing element absorbing only small amount of light as the polarizing element disposed on the relay lens 8 side entrance portion of the PBS prism 23. In this case, deterioration of the polarizing element, PBS prism 23, and liquid crystal light valve 22 due to generated heat can be prevented, and images having high contrast can be formed. The specific examples of the reflection type polarizing element are similar to those in the first embodiment.

Third Embodiment

A third embodiment according to the invention is now described with reference to FIG. 4.

The basic structure of a projector according to this embodiment is substantially equivalent to that of the projector in the first embodiment, but is different in that a time division driving type reflection type small mirror array device is used in lieu of the liquid crystal light valve used in the first or second embodiment.

Figure 4:
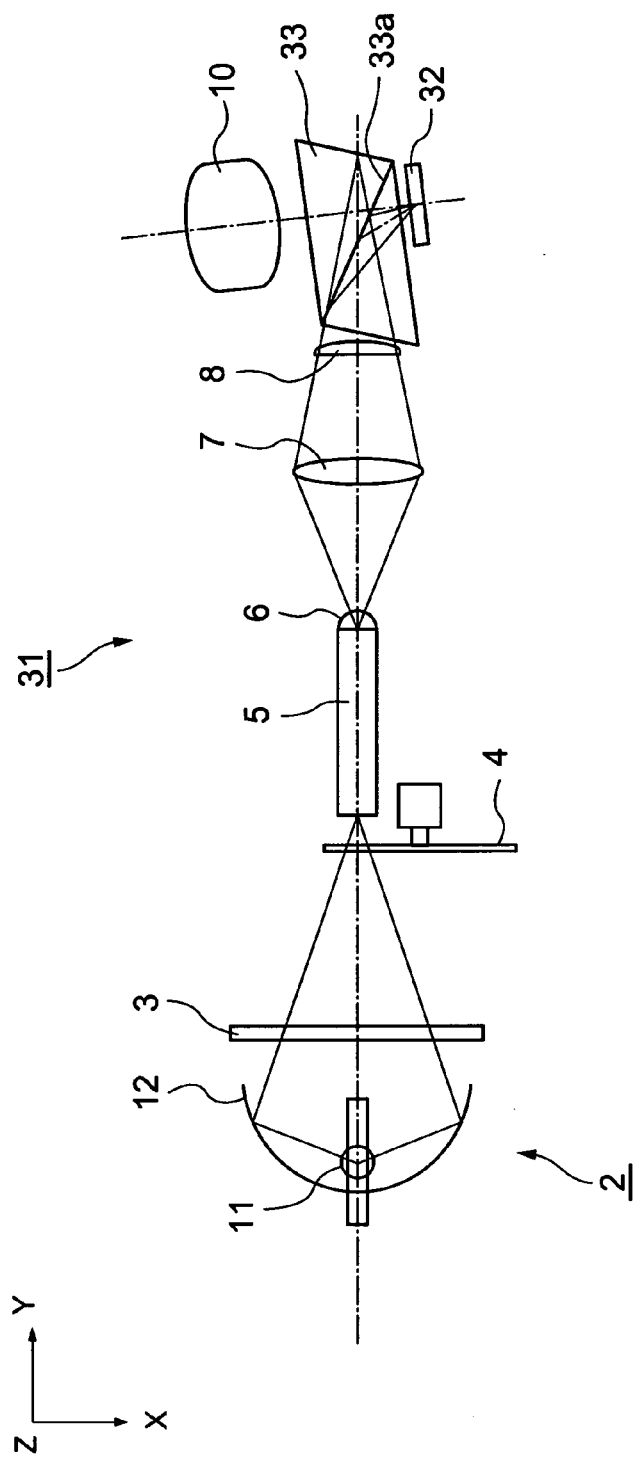
FIG. 4 schematically illustrates a structure of a projector according to a third embodiment of the invention.

FIG. 4 schematically illustrates the structure of the projector according to this embodiment. In FIG. 4, similar reference numbers are given to components common to those used in the first embodiment shown in FIG. 1, and detailed explanation of those components is not repeated.

According to a projector 31 in this embodiment illustrated in FIG. 4, a TIR prism 33 containing a total reflection surface 33a which achieves total reflection of light entering at a specific angle is provided between the relay lens 8 and a reflection type small mirror array light valve 32 (light modulation element, hereinafter abbreviated as mirror array light valve in some cases). Light released from the relay lens 8 is reflected by the total reflection surface 33a, and enters the mirror array light valve 32. The mirror array light valve 32 is a light modulation element capable of switching the inclination of the small mirror between two values, and controls the direction of the reflected light by varying the angle of the small mirror based on information inputted from outside. More specifically, light forming an image is reflected toward the projection lens 10, and light not forming the image is reflected in a direction different from the direction toward the projection lens 10 so that an appropriate display image can be formed. According to this structure, the light forming the image enters the TIR prism 33, passes through the total reflection surface 33a (emitted light having small incident angle to the total reflection surface 33a is not reflected), and reaches the projection lens 10. On the other hand, the light not forming the image is reflected by the total reflection surface 33a in a direction different from the direction toward the projection lens 10, and thus does not enter the projection lens 10.

Similarly to the above embodiments, the projector 31 according to this embodiment can accurately overlap a visible color image and invisible infrared image on one screen. Thus, the necessity for matching the display positions of the visible image and the infrared image is eliminated, and easiness of use is enhanced. Moreover, the compactness of the display system increases portability of the system. Accordingly, advantages similar to those in the first and second embodiments can be offered according to this embodiment.

In addition, the reflection type small mirror array light valve generally having high-speed responsiveness is appropriate for a projector including time-division display type light modulation element which produces a visible image overlapped with an infrared image through successive display of monochromatic images.

Fourth Embodiment

A fourth embodiment according to the invention is now described with reference to FIG. 5 and FIGS. 6A and 6B.

The basic structure of a projector according to this embodiment is substantially equivalent to that of the projector in the second embodiment, but is different in that a plurality of light sources including an additional light source for emitting infrared light are used in this embodiment.

Figure 5:
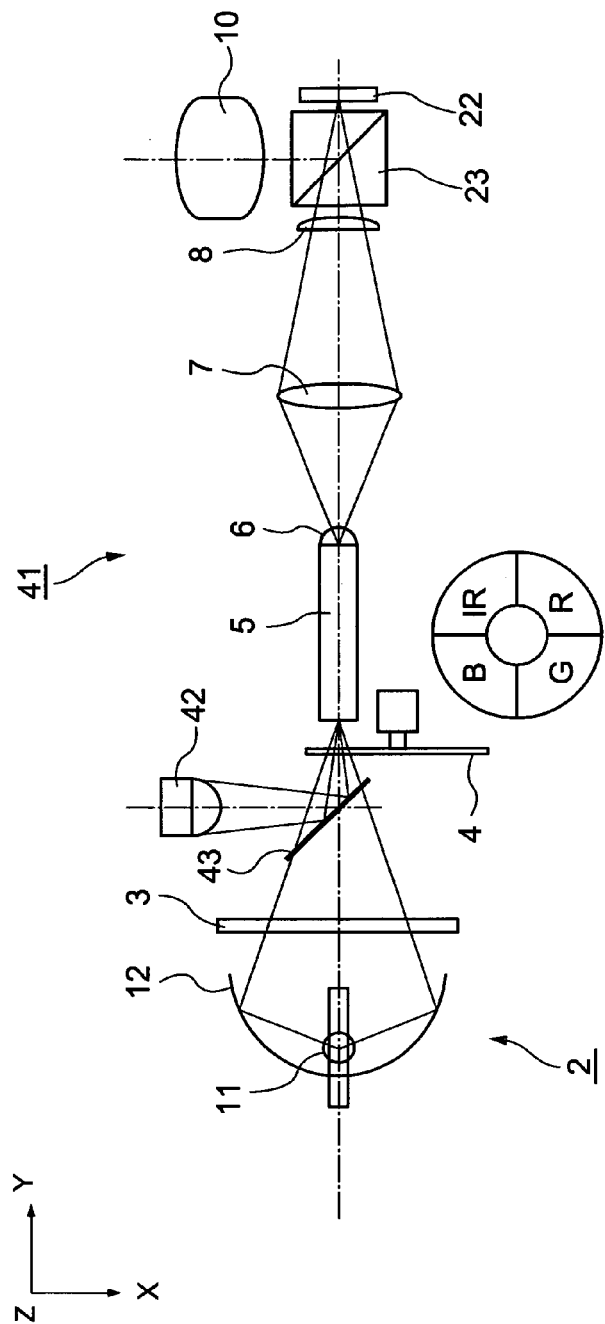
FIG. 5 schematically illustrates a structure of a projector according to a fourth embodiment of the invention.
Figure 6A:
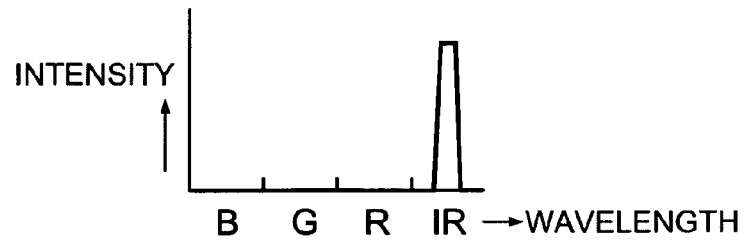
FIG. 6A shows spectral characteristics of a second light source included in the projector shown in FIG. 5.
Figure 6B:
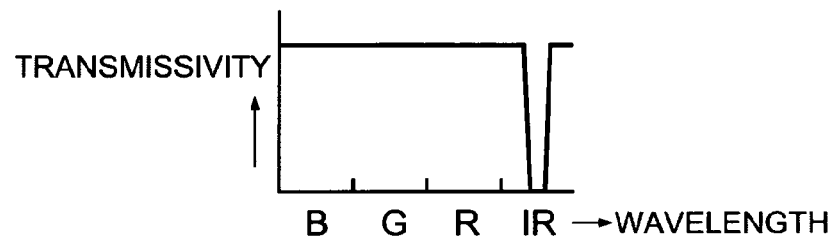
FIG. 6B shows spectral characteristics of a dichroic mirror included in the projector shown in FIG. 5.

FIG. 5 schematically illustrates the structure of the projector according to this embodiment. FIG. 6A shows spectral characteristics (spectral distribution) of a second light source, and FIG. 6B shows spectral characteristics of a dichroic mirror used in the projector. In FIG. 5, similar reference numbers are given to components common to those used in the second embodiment shown in FIG. 3, and detailed explanation of those components is not repeated.

Most of discharge type light sources such as high pressure mercury lamp and metal halide lamp emit infrared light as well as visible light. However, it is generally difficult to produce infrared light having high intensity (xenon lamp and halogen lamp generate infrared light having relatively high intensity, but intensity balance of three primary colors constituting white light is not preferable). An Image shooting element such as CCD and CMOS sensor has sensitivity in the range expanding to the infrared range (approximately 1.1 μm). However, the sensitivity considerably lowers in the wavelength range exceeding 800 nm. In additions most environmental light includes infrared light, and it is necessary to increase display luminance of an infrared image for vivid display and easy shooting by the image shooting element in case of the infrared image.

Accordingly, a projector 41 according to this embodiment illustrated in FIG. 5 includes a second light source 42 which emits infrared light in addition to the first light source 2. The first light source 2 may be a lamp capable of emitting light containing white light and infrared light similar to those used in the first through third embodiments. The ultraviolet light cut filter 3 is disposed on the light exit side of the first light source 2 as necessary. The second light source 42 is constituted by an infrared LED (Light-Emitting Diode) which emits infrared light. The second light source 42 may be formed by halogen lamp, xenon lamp, infrared laser or the like. However, Since light from the first light source 2 and light from the second light source 42 need to be combined on the same optical path, the infrared LED or infrared laser having a narrow emission wavelength range is particularly preferable for the second light source 42. FIG. 6A shows spectral characteristics of light emitted from the second light source 42. As apparent from the figure, a peak is found in the infrared range, and the wavelength range partially overlaps with the wavelength range of light (infrared light) emitted from the first light source 2. Thus, a part of a specific wavelength range of the infrared light emitted from the first light source 2 is replaced with the infrared light emitted from the second light source 42. Of course, there is a possibility that the light emission wavelength ranges of the first light source 2 and the second light source 42 do not overlap with each other at all.

A dichroic mirror 43 (light combining unit) is disposed on the optical paths of lights emitted from the first light source 2 and the second light source 42. According to the spectral characteristics shown in FIG. 6B, the dichroic mirror 43 reflects a part of light in the infrared range and transmits other light, and the reflection wavelength range of the dichroic mirror 43 generally coincides with the wavelength range of the light emitted from the second light source 42 shown in FIG. 6A. Thus, the light emitted from the first light source 2 becomes visible light and infrared light from which unnecessary ultraviolet light is removed by the ultraviolet light cut filter 3, and a part of this visible light and infrared light is combined with the infrared light emitted from the second light source 42 by the dichroic mirror 43 (infrared light emitted from the first light source 2 and having the same wavelength range as that of the second light source 42 does not contribute to display and is reflected by the dichroic mirror 43). That is, in case of infrared light, the infrared light emitted from the first light source 2 and having a relatively broad wavelength range is combined with the infrared light emitted from the second light source 42 and having a relatively peaky wavelength range to increase the overall intensity of the infrared light. The light combined by the dichroic mirror 43 passes through the rotational color filter 4 (spectral characteristics of which are similar to those in the first embodiment), the rod integrator 5, the relay lenses 6, 7, and 8, and the PBS prism 23, and enters the reflection type liquid crystal light valve 22. The behavior of the light having entered the PBS prism 23 is similar to that in the second embodiment.

Similarly to the above embodiments, the projector 41 according to this embodiment can accurately overlap a visible color image and invisible infrared image on one screen. Thus, the necessity for matching the display positions of the visible image and the infrared image is eliminated, and easiness of use is enhanced. Moreover, the compactness of the display system increases portability of the system. Accordingly, (advantages similar to those in the first through third embodiments can be offered according to this embodiment.

According to the structure of this embodiment described above, the display luminance of the infrared image can be easily increased by separately disposing the second light source 42 for emitting infrared light from the first light source 2. Thus, vivid display and easy shooting by the image shooting element can be achieved in case of infrared image even in the presence of environmental light including infrared light.

In the structure where the infrared LED as the second light source allowing intermittent lighting emits light in synchronization with the rotation of the rotational color filter 4, it is possible to combine the light from the first light source 2 with the light from the second light source 42 downstream from the rotational color filter 4 (on liquid crystal light valve 22 side). According to this structure, the infrared light from the second light source 42 does not pass through the rotational color filter 4, and thus light utilization efficiency easily enhances. Other light sources allowing intermittent lighting are laser beam source, organic EL element, inorganic EL element, FED, and xenon lamp, for example, which can be all employed as the second light source.

Fifth Embodiment

A fifth embodiment according to the invention is now described with reference to FIG. 7 and FIGS. 8A and 8B.

The basic structure of a projector according to this embodiment is substantially equivalent to that of the projector in the fourth embodiment, but is different in that two light sources for emitting infrared light are added in this embodiment unlike the case of one light source added for emitting infrared light in the fourth embodiment.

Figure 7:
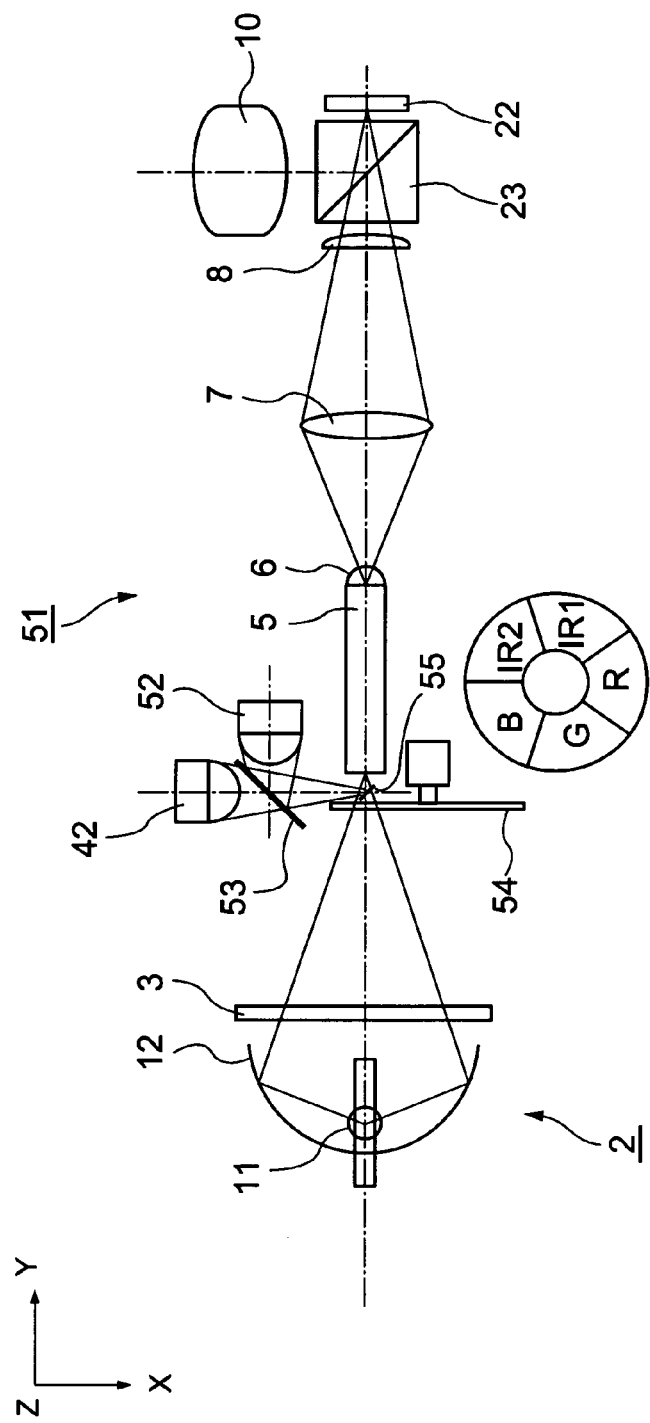
FIG. 7 schematically illustrates a structure of a projector according to a fifth embodiment of the invention.
Figure 8A:
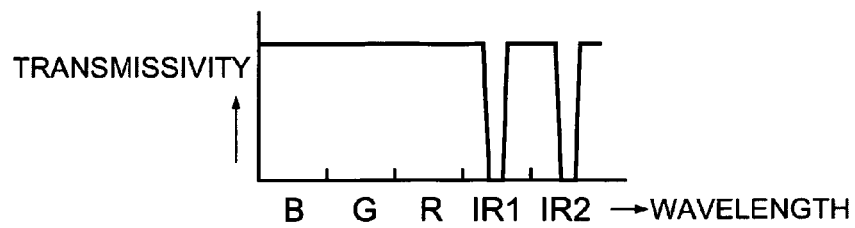
FIG. 8A shows spectral characteristics of a first dichroic mirror included in the projector shown in FIG. 7.
Figure 8B:
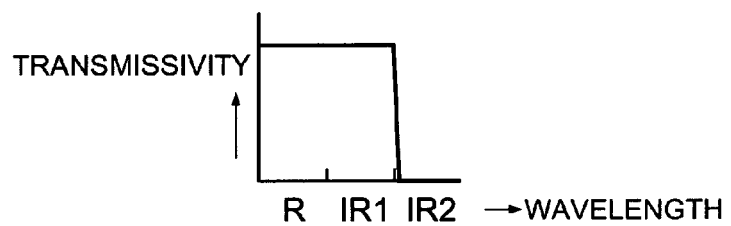
FIG. 8B Shows spectral characteristics of a second dichroic mirror included in the projector shown in FIG. 7.

FIG. 7 schematically illustrates the structure of the projector according to this embodiment. FIG. 5A shows spectral characteristics (spectral distribution) of a first dichroic mirror, and FIG. 8B shows spectral characteristics of a second dichroic mirror used in the projector. In FIG. 7, similar reference numbers are given to components common to those used in the fourth embodiment shown in FIG. 5, and detailed explanation of those components is not repeated.

As illustrated in FIG. 7, a projector 51 according to this embodiment has a third light source 52 for emitting second infrared light (IR2 light) having a wavelength range not overlapping with that of first infrared light (IR1 light) emitted from the second light source 42 in addition to the second light source 42. The projector 51 further includes a second dichroic mirror 53 disposed on the optical paths of the infrared lights emitted from the second light source 42 and the third light source 52. According to the spectral characteristics of the second dichroic mirror 53 shown in FIG. 8B, the second dichroic mirror 53 reflects the IR2 light of the infrared lights and transmits the IR1 light. Thus, the IR1 light is combined with the IR2 light by the second dichroic mirror 53. A first dichroic mirror 55 (light combining unit is disposed on the light emission side of a rotational color filter 54 and on the optical paths of the light from the first light source 2 and the combined light of the IR1 light and the IR2 light. According to the spectral characteristics of the first dichroic mirror 55 shown in FIG. 8A, the first dichroic mirror 55 reflects the IR1 light and IR2 light of the infrared lights and transmits light in other wavelength range. Thus, a part of the visible light and infrared light emitted from the first light source 2 is combined with the combined light of the IR1 and IR2 by the first dichroic mirror 55.

Similarly to the above embodiments, the projector 51 according to this embodiment can accurately overlap a visible color image and invisible infrared image on one screen. Thus, the necessity for matching the display positions of the visible image and the infrared image is eliminated, and easiness of use is enhanced. Moreover, the compactness of the display system increases portability of the system. Accordingly, advantages similar to those in the first through fourth embodiments can be offered according to this embodiment.

According to the structure of this embodiment described above, the display luminance of the infrared image can be easily increased by separately disposing the second light source 42 and third light source 52. For emitting infrared light from the first light source 2. Thus, vivid display and easy shooting by the image shooting element can be achieved in case of infrared image even in the presence of environmental light including infrared light.

In the structure where a light source allowing intermittent lighting (for example, LED (Light-Emitting Diode) light source, laser beam source, organic EL (Electro-Luminescence) element, inorganic EL element, FED (Field Emission Display), and xenon lamp) is used as the second light source 42 or the third light source 52, the light from the first light source 2 can be combined with the lights from the second light source 49 and third light source 52 downstream from the rotational color filter 54 (on liquid crystal light valve 22 side) as in this embodiment. According to this structure, the second light source 42 and third light source 52 need to provide intermittent lighting in synchronization with emission of the IR1 light and IR2 light from the rotational color filter 54. In this case, the infrared lights from the second light source 42 and third light source 52 do not pass trough the rotational color filter 54, and thus light utilization efficiency easily enhances. Moreover, the diameter of the dichroic mirror is smaller than that in the structure where the dichroic mirror is disposed on the entrance side of the rotational color filter 54 as in the structure of the fourth embodiment.

Since lights from two or more light sources are combined in the dichroic mirror in the fourth and fifth embodiments, light loss is produced when lights having the same wavelength range are combined. It is possible, however, to apply polarization conversion to lights emitted from the two light sources such that polarization conditions of these lights differ from each other (for example, lights from the first light source 2 and the second light source 42 are converted into P-polarized light and S-polarized light, respectively, in the projector 41 of the fourth embodiment) and then to combine the resultant two lights by a polarizing element such as a polarization beam splitter. In this case, light loss can be considerably reduced even when lights having the same wavelength range are combined.

It is assumed that the second light source 42 and third light source 52, emit infrared light having a wavelength range similar to that of light emitted from the first light source 2 to increase the intensity of the infrared light emitted from the first light source 2 in the fourth and fifth embodiments. However, the second light source and third light source may emit infrared light having a wavelength range different from that of the light emitted from the first light source 2. In this case, the structure similar to the structure described above can be employed.

Sixth Embodiment

A sixth embodiment according to the invention is now described with reference to FIG. 9.

The basic structure of a projector according to this embodiment is substantially equivalent to those of the projectors in the second, fourth, and fifth embodiments, but is different in that a plurality of light sources which emit lights having different wavelength ranges are used.

Figure 9:
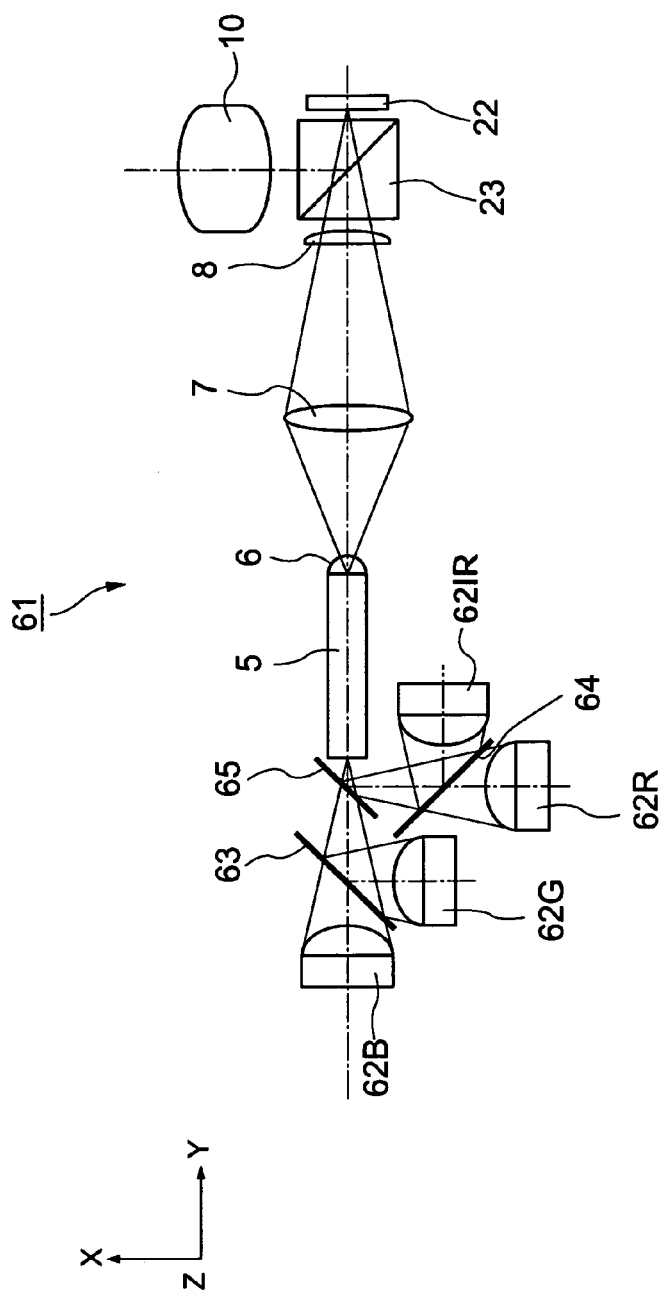
FIG. 9 schematically illustrates a structure of a projector according to a sixth embodiment of the invention.

FIG. 9 schematically illustrates the structure of the projector according to this embodiment. In FIG. 9, similar reference numbers are given to components common to that used in the second embodiment shown in FIG. 3, and detailed explanation of those components is not repeated.

It is assumed that a white light source which emits light having an emission wavelength range expanding substantially to the entire visible range is used as the first light source in the respective embodiments described above. However, a plurality of light sources allowing intermittent lighting and emitting lights having substantially no overlapping emission wavelength range between one another may be used as in this embodiment.

As illustrated in FIG. 9, a projector 61 according to this embodiment has four light sources 62B, 62G, 62R, and 62IR having different emission wavelength ranges. Each of the light sources may be constituted by an LED light source, or other solid light sources such as laser, organic EL element, inorganic EL element, and FED, According to this embodiment, a first dichroic mirror 63 is disposed on the optical paths of B light emitted from the blue LED light source 62B and G light emitted from the green LED light source 62G. The B light from the blue LED light source 62B and the G light from the green LED light source 62G are combined by the first dichroic mirror 63. A second dichroic mirror 64 is disposed on the optical paths of R light emitted from the red LED light source 62FR and IR light, emitted from the infrared LED light source 62IR. The R light from the red LED light source 62R and the IR light from the infrared LED light source 62IR are combined by the second dichroic mirror 64. A third dichroic mirror 65 is disposed on the optical paths of the light as combined light of the B light and G light and the light as combined light of the R light and IR light. The combined light of the B and G lights is combined with the combined light of the R and IR lights by the third dichroic mirror 65.

The light thus combined passes the rod integrator 5, the relay lenses 6, 7 and 8, and the PBS prism 23, and enters the reflection type liquid crystal light valve 22. The behavior of the light having entered the PBS prism 23 is similar to that in the second embodiment. The respective light sources constituted by LED light sources allowing intermittent lighting intermittently emit lights in a sequential and successive manner (lighting time of each light source is approximately 1/240 second) in the order of the blue LED light source 62B, green LED light source 62C, red LED light source 62R, and infrared LED light source 62IR, and returning to the blue LED light source 62B, for example, so that the respective lights divided by the reflection type liquid crystal light valve 22 in a time-division manner can be sequentially emitted. It is preferable to remove lights having unnecessary wavelength ranges from the lights emitted from the light sources 62B, 62G, 62R and 62IR using an optical filter as necessary so that no emission wavelength range is overlapped between the lights emitted from the respective light sources.

Similarly to the above embodiments, the projector 61 according to this embodiment can accurately overlap a visible color image and invisible infrared image on one screen. Thus, the necessity for matching the display positions of the visible image and the infrared image is eliminated, and easiness of use is enhanced. Moreover, the compactness of the display system increases portability of the system. Accordingly, advantages similar to those in the first through fifth embodiments can be offered according to this embodiment.

According to the structure of this embodiment, the four light sources 62B, 62G, 62R and 62IR which emit lights having no overlapping emission wavelength range are used for intermittent lighting. Thus, the necessity for providing a light division unit such as a rotational color filter is eliminated, and improvement over light utilization efficiency and size reduction of the optical systems can be easily achieved. Furthermore, Since the separate light source for infrared light (infrared LED light source 62IR) is used, the luminance of the infrared image can be easily increased.

Seventh Embodiment

A seventh embodiment according to the invention is now described with reference to FIG. 10 and FIGS. 11A through 11D.

While only one light modulation element is used in each of the embodiments described above, a plurality of light modulation elements are used in this embodiment. Particularly, two time-division driving type reflection type liquid crystal light valves are employed in this embodiment.

Figure 10:
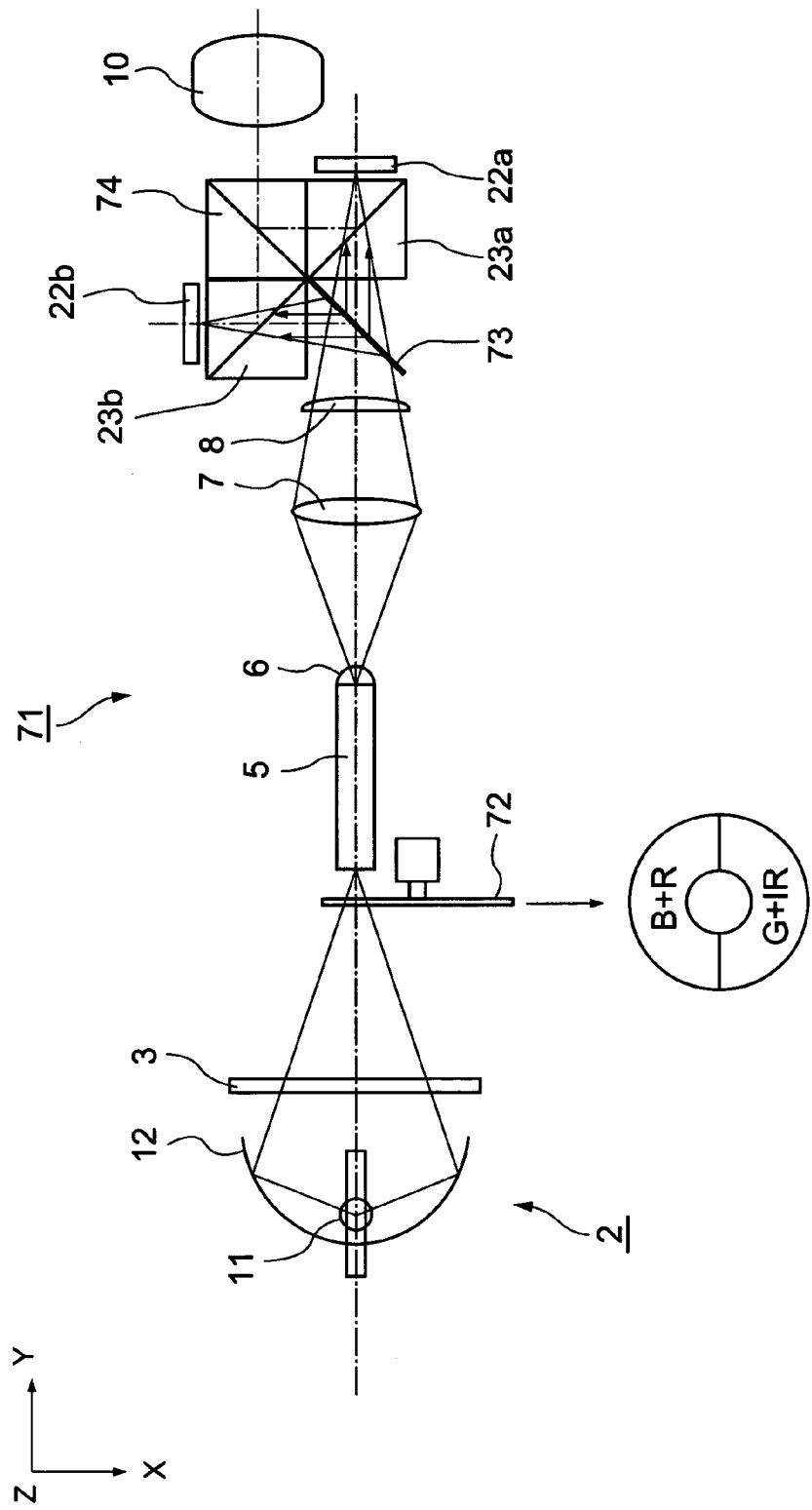
FIG. 10 schematically illustrates a structure of a projector according to a seventh embodiment of the invention.
Figure 11A:
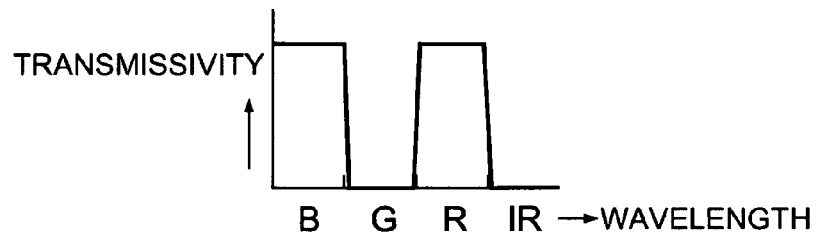
FIGS. 11A and 11B show spectral characteristics of a rotational color filter included in the projector shown in FIG. 10.
Figure 11B:
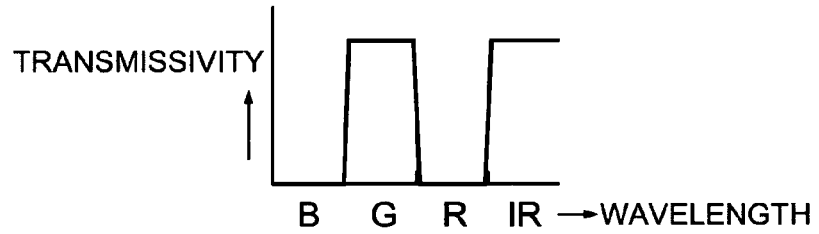
Figure 11C:
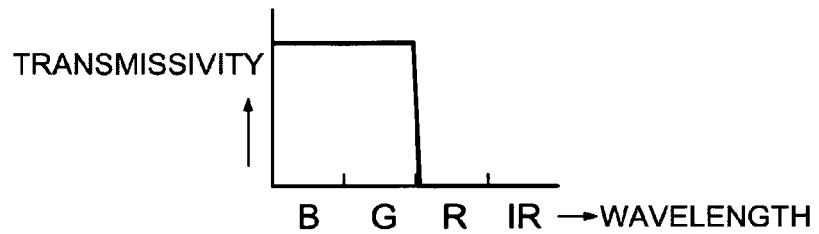
FIG. 11C shows spectral characteristics of a dichroic mirror included in the projector showman in FIG.
Figure 11D:
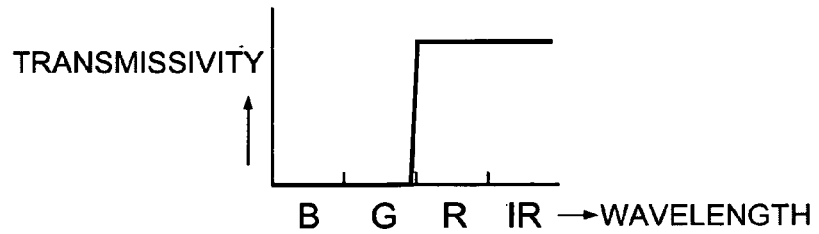
FIG. 11D shows spectral characteristics of a dichroic prism included in the projector shown in FIG. 10.

FIG. 10 schematically illustrates the structure of the projector according to this embodiment. FIGS. 11A and 11B show spectral characteristics of a rotational color filter, FIG. 11C shows spectral characteristics of a dichroic mirror, and FIG. 11D shows spectral characteristics of a dichroic prism included in the projector. In FIG. 10, similar reference numbers are given to components common to that used in the first embodiment shown in FIG. 1, and detailed explanation of those components is not repeated.

As illustrated in FIG. 10, a projector 71 according to this embodiment includes two reflection type liquid crystal light valves of first liquid crystal light valve 22a and second liquid crystal light valve 22b. A rotational color filter 72 has two color filters having different transmission wavelength ranges and substantially the same area as shown in FIGS. 11A and 11B. More specifically, the rotational color filter 72 has a color filter transmitting B light and R light and reflecting G light and IR light as shown in FIG. 11A, and a color filter transmitting G light and IR light and reflecting B light and R light as shown in FIG. 11B. The entering light is successively divided into first light (combined light of B light and R light) and second light (combined light of G light and IR light) having different wavelength ranges in a time-division manner. The rotational color filter 72 rotates once in $1/60$ second. Light to be emitted from the rotational color filter 72 switches between the combined light of the B and R lights and the combined light of the G and IR lights approximately for every $1/120$ second. The time-divided respective lights pass through the rod integrator 5 and the relay lenses 6, 7 and 8, and sequentially enter the dichroic mirror 73 (light spatially dividing unit).

As apparent from the spectral characteristics shown in FIG. 11C, the dichroic mirror 73 transmits B light and C light, and reflects R light and IR light. Thus, the first light is divided into B light as transmission light and R light as reflection light while the first light is entering the dichroic mirror 73. Then, the respective lights pass through a first polarization beam splitter prism (PBS prism) 23a and a second PBS prism 23b, and enter the corresponding first liquid crystal light valve 22a and second liquid crystal light valve 22b. Similarly, the second light is divided into G light as transmission light and IR light as reflection light. Then, the respective lights pass through the first PBS prism 23a and the second PBS prism 23b and enter the first liquid crystal light valve 22a and the second liquid crystal light valve 22b. The behaviors of the lights entering the respective PBS prism 23a and 23b (polarized lights) are similar to those in the second embodiment, and explanation of those behaviors is not repeated. The projection lights released from the first liquid crystal light valve 22a and the second liquid crystal light valve 22b are S-polarized lights.

Image data in the two liquid crystal light valves 22a and 22b are rewritten for every $1/120$ second in correspondence with emission intervals of the first light and second light. More specifically, Since the liquid crystal light valves 22a and 22b successively modulate two types of light based on time divisions, the modulation time (image display time) per one type of light is twice longer than the modulation time in the second embodiment. In this case, the modulation time of the liquid crystal light valves 22a and 22b becomes longer than that of the projector in the second embodiment, and thus the liquid crystal light valve whose response time is relatively long can be used. Moreover, Since the modulation time (image display time) of infrared light is long, image shooting and image detection by the image shooting element can be easily achieved even in case of low intensity of infrared light emitted from the light source 2.

The lights containing image information and emitted from the respective liquid crystal light valves 22a and 22b again enter the corresponding PBS prisms 23a and 23b, and light under the polarization condition corresponding to the image information is separated from the lights having entered the PBS prisms 23a and 23b. Then, the separated light enters a dichroic prism 74 (light combining unit). According to the spectral characteristics shown in FIG. 11D, the dichroic prism 74 reflects B light and G light and transmits R light and IR light. Thus, the lights from the PBS prisms 23a and 23b are combined by the dichroic prism 74, and successively projected onto a not shown screen via the projection lens 10. Then, an image produced by the first light (B light and R light) and an image produced by the second light (G light and IR light are successively displayed on the screen for every $1/120$ second. However, the projected images are visually recognized as a visible color image on which the infrared light is superimposed without time division due to visual characteristics of human eyes.

Similarly to the above embodiments, the projector 71 according to this embodiment can accurately overlap a visible color image and invisible infrared image on one screen. Thus, the necessity for matching the display positions of the visible image and the infrared image is eliminated, and easiness of use is enhanced. Moreover, the compactness of the display system increases portability of the system. Accordingly, advantages similar to those in the first through sixth embodiments can be offered according to this embodiment.

According to this embodiment, the liquid crystal light valve having relatively long response time can be used. Thus, particular advantages such as easy image shooting and image detection by the image shooting element can be offered even in case of low intensity of infrared light.

For increasing polarization separation by the PBS prisms 23a and 23b, it is possible to dispose polarizing elements on the dichroic mirror 73 side entrance portion and the dichroic prism 74 side exit portion of each of the PBS prisms 23a and 23b from a viewpoint similar to that in the second embodiment. It is also possible to provide a wavelength plate (phase difference plate, retarder) between the second PBS prism 23b and the dichroic prism 74 such that P-polarized light as projection light can enter the dichroic prism 74 from the second liquid crystal light valve 22b, or to dispose the second liquid crystal light valve 22b on a different surface of the second PBS prism 23b and provide a wavelength plate (phase difference plate, retarder) between the dichroic mirror 73 and the second PBS prism 23b such that P-polarized light as project on light can be released from the second liquid crystal light valve 22b. In this case, the PBS prism can be used in place of the dichroic prism 74, which increases light utilization efficiency.

It is assumed in this embodiment that B light, G light, R light and IR light having different wavelength ranges constitute the first light and the second light. It is possible, however, to use three types of infrared light having different wavelength ranges, for example, since the optical systems in this structure can handle types of light an integral number times as many as the number of the liquid crystal light valves. In this case, more various controls over the display information can be performed. It is also possible to modulate visible light using the first liquid crystal light valve 22a and modulate infrared light using the second liquid crystal light valve 22b by changing the optical characteristics of the rotational color filter 72, the dichroic mirror 73, the dichroic prism 74, or others. In this case, the modulation time of infrared light (image display time) becomes long. Thus, image shooting and image detection by the image shooting element can be easily achieved even in case of low intensity of infrared light emitted from the light source 2.

Eighth Embodiment

An eighth embodiment according to the invention is now described with reference to FIG. 12.

According to this embodiment, a plurality of light sources and a plurality of light modulation elements are used. Particularly, two light sources and two reflection type liquid crystal light valves are included in this embodiment.

Figure 12:
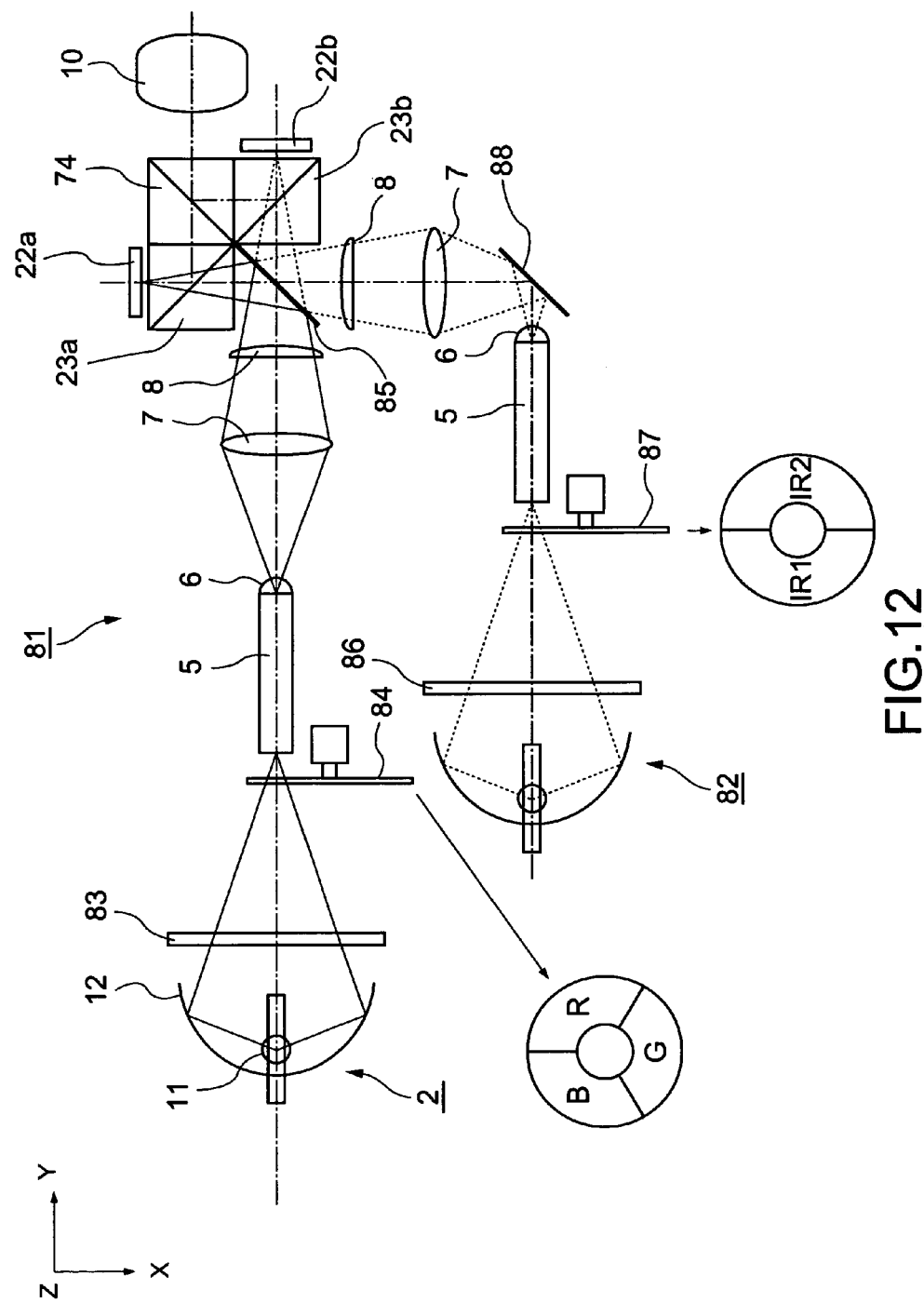
FIG. 12 schematically illustrates a structure of a projector according to an eighth embodiment of the invention.

FIG. 12 schematically illustrates a structure of a projector in this embodiment. In FIG. 1z, similar reference numbers are given to components to common to that used in the seventh embodiment shouts in FIG. 10, and detailed explanation of those components is not repeated.

As illustrated in FIG. 12, a projector 81 according to this embodiment has a light source for visible that 2 having a wide emission wavelength range (first light source, similar to that used in the first embodiment) and a light source for infrared light 82 (second light source, such as xenon lamp and halogen lamp). Unnecessary ultraviolet light and infrared light are removed from light emitted from the light source for visible light 2 by an ultraviolet light and infrared light cut filter 83. Then, the resultant light enters a first rotational color filter 84 (light time division unit), and is successively divided into visible lights of B light, G light and R light having different wavelength ranges in a time-division manner. The first rotational color filter 84 rotates once in $1/60$ second, and light released substantially every $1/180$ second successively changes to different color light in the order of B light, C light, and R light, and returns to B light. The time-divided respective lights pass through a both-surface reflection mirror 85 and the first PBS prism 23a and sequentially enter the time-division driving type first liquid crystal light valve 22a. The entering light is modulated based on information inputted from outside, and successively released as modulated light containing image information (of course, image data in the first liquid crystal light valve 22a is rewritten for every $1/180$ second in accordance with each emission time of the entering color lights).

On the other hand, unnecessary ultraviolet light and visible light are removed from light emitted from the light source for infrared light 82 by an ultraviolet light and visible light cut filter 86. Then, the resultant light enters a second rotational color filter 87 (light time division unit), and is successively divided into infrared lights of IR1 light and IR2 light having different wavelength ranges in a time-division manner. The second rotational color filter 87 rotates once in $1/60$ second, and light released substantially every $1/120$ second successively changes between the IR1 light and IR2 light. The time-divided respective infrared lights pass through a reflection mirror 88, the both-surface reflection mirror 85, and the second PBS prism 23b and sequentially enter the time-division driving type second liquid crystal light valve 22b. The entering light is modulated based on information inputted from outside, and successively released as modulated light containing image information (of course, image data in the second liquid crystal light valve 22b is rewritten for every $1/120$ second in accordance with each emission time of the entering color lights).

The behaviors of the lights (polarized lights) having entered the first PBS prism 23a and the second PBS prism 23b are similar to those in the second embodiment. The light containing the image information and released from the respective liquid crystal light valves 22a and 32b again enters the corresponding PBS prisms 23a and 23b. After lights having polarization condition corresponding to the image information are separated, these lights are combined by the dichroic prism 74. Then, the combined light is successively projected on a not shown, screen via the projection lens 10.

Similarly to the above embodiments, the projector 81 according to this embodiment can accurately overlap a visible color image and invisible infrared image on one screen. Thus, the necessity for matching the display positions of the visible image and the infrared image is eliminated, and easiness of use is enhanced. Moreover, the compactness of the display system increases portability of the system. Accordingly, advantages similar to those in the first through seventh embodiments can be offered according to this embodiment.

According to the structure of this embodiment, the light source for visible light 2 and the light source for infrared light 82 are used in correspondence with the first and second liquid crystal light valves 22a and 22b, respectively. Thus, the wavelength range of modulated light can be determined for each of the liquid crystal light valves 22a and 22b. Accordingly, display information can be controlled for each light having different wavelength range even in case of the structure having the plural light sources and the plural liquid crystal light valves (light having the same wavelength range is not modulated by plural liquid crystal light valves).

According to the projector 81 in this embodiment, image display time (subframe time) for each light in the liquid crystal light valve 22a is different from that in the liquid crystal light valve 22b. More specifically, the display timing is established such that two pictures (two frames) of infrared image produced by the second liquid crystal light valve 22b can be successively displayed during the display time ($1/60$ second) of 1 frame (constituted by three pictures of subframe) of color image produced by the first liquid crystal light valve 22a. Since the color image and the infrared image have no effect of display on each other, no problem occurs when the image display time for each light in the liquid crystal light valve 22a is different from that in the liquid crystal light valve 22b. Moreover, Since the modulation time of infrared light (image display time) becomes long, image shooting and image detection by the image shooting element can be easily achieved even in case of low intensity of infrared light emitted from the light source for infrared light 82.

Ninth Embodiment

A ninth embodiment according to the invention is now described with reference to FIG. 13.

The basic structure of a projector according to this embodiment is similar to that of the projector according to the eighth embodiments but is different in that the light source for infrared light used in the eighth embodiment is replaced with two light sources allowing intermittent lighting.

Figure 13:
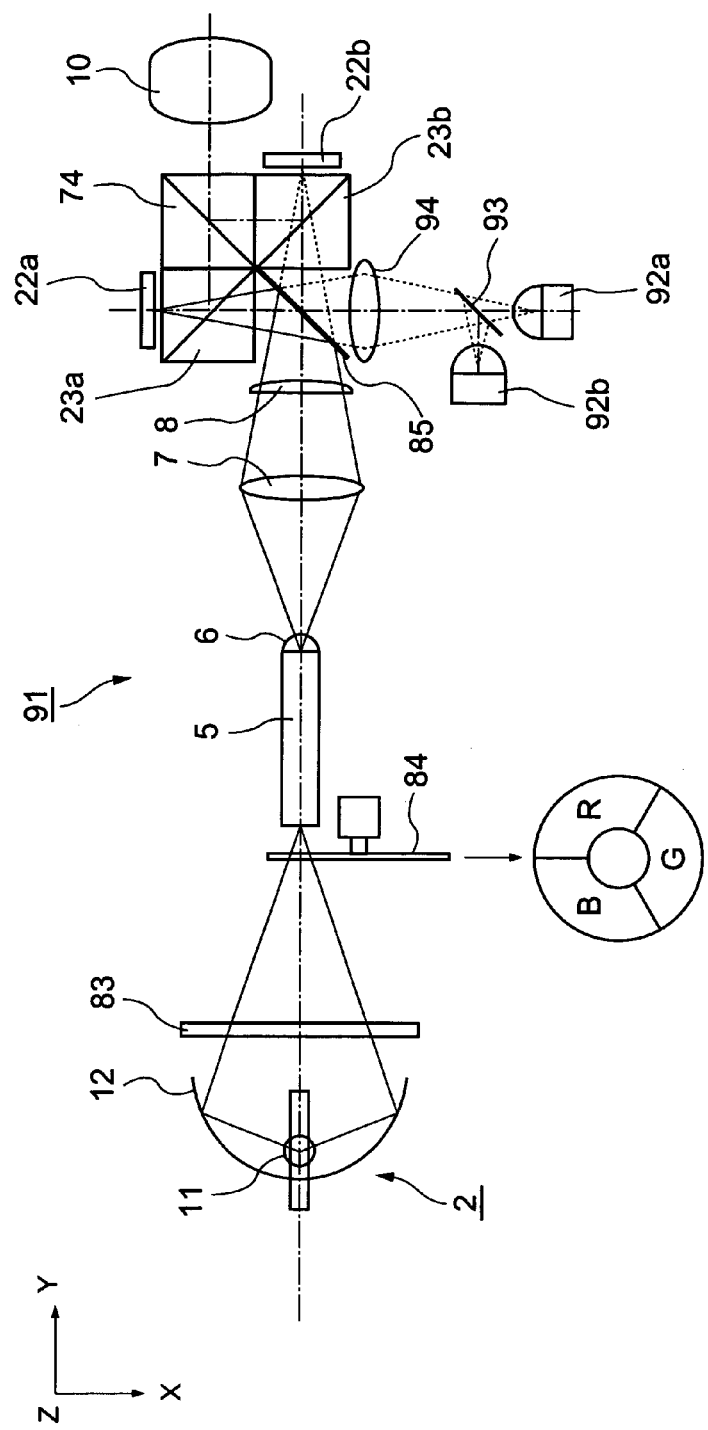
FIG. 13 schematically illustrates a structure of a projector according to a ninth embodiment of the invention.

FIG. 13 schematically illustrates the projector according to this embodiment. In FIG. 13, similar reference numbers are given to components common to that used in the eighth embodiment shown in FIG. 12, and detailed explanation of those components is not repeated.

As illustrated in FIG. 13, a projector 91 according to this embodiment has two light sources for infrared light 92a and 92b (second light sources) having different emission wavelength ranges and allowing intermittent lighting. These light sources may be LED light sources, or solid light sources such as laser, organic EL element, inorganic EL, element, and FED. A dichroic mirror 93 is disposed on the optical paths of IR1 light emitted from the first light source for infrared light 92a and IR2 light emitted from the second light source for infrared light 92b. The IR1 light and IR2 light are combined by the dichroic mirror 93. The behaviors of the lights (polarized lights) having entered the first PBS prism 23a, the second PBS prism 23b, and the dichroic prism 74 are similar to those in the eighth embodiment. A relay lens 94 is further provided.

Similarly to the above embodiments, the projector 91 according to this embodiment can accurately overlap a visible color image and invisible infrared image on one screen. Thus, the necessity for matching the display positions of the visible image and the infrared image is eliminated, and easiness of use is enhanced. Moreover, the compactness of the display system increases portability of the system. Accordingly, advantages similar to those in the first through eighth embodiments can be offered according to this embodiment.

According to this embodiment, the light sources for infrared light 92a and 92b having narrow bands and allowing intermittent lighting are used. Thus, particular advantages such as compactness and simplification of the optical systems, and also easy increase in luminance of the infrared image by raising the intensity of infrared light separately from the intensity of visible light can be offered.

According to the structure which includes the liquid crystal light valve 22b for modulating only infrared light as in the eighth and ninth embodiments, the infrared image does not have sub-frame image. Thus, a light valve having resolution lower than that of a visible light liquid crystal light valve can be used as infrared light liquid crystal light valve. Accordingly, cost reduction, increase in luminance with enlargement of the aperture ratio, and enhancement of heat resistance of the liquid crystal light valve can be achieved.

Tenth Embodiment

A tenth embodiment according to the invention is now described with reference to FIG. 14.

The basic structure of a projector according to this embodiment is similar to that of the projector according to the ninth embodiment, but is slightly different in the structures of light source and illumination system.

Figure 14:
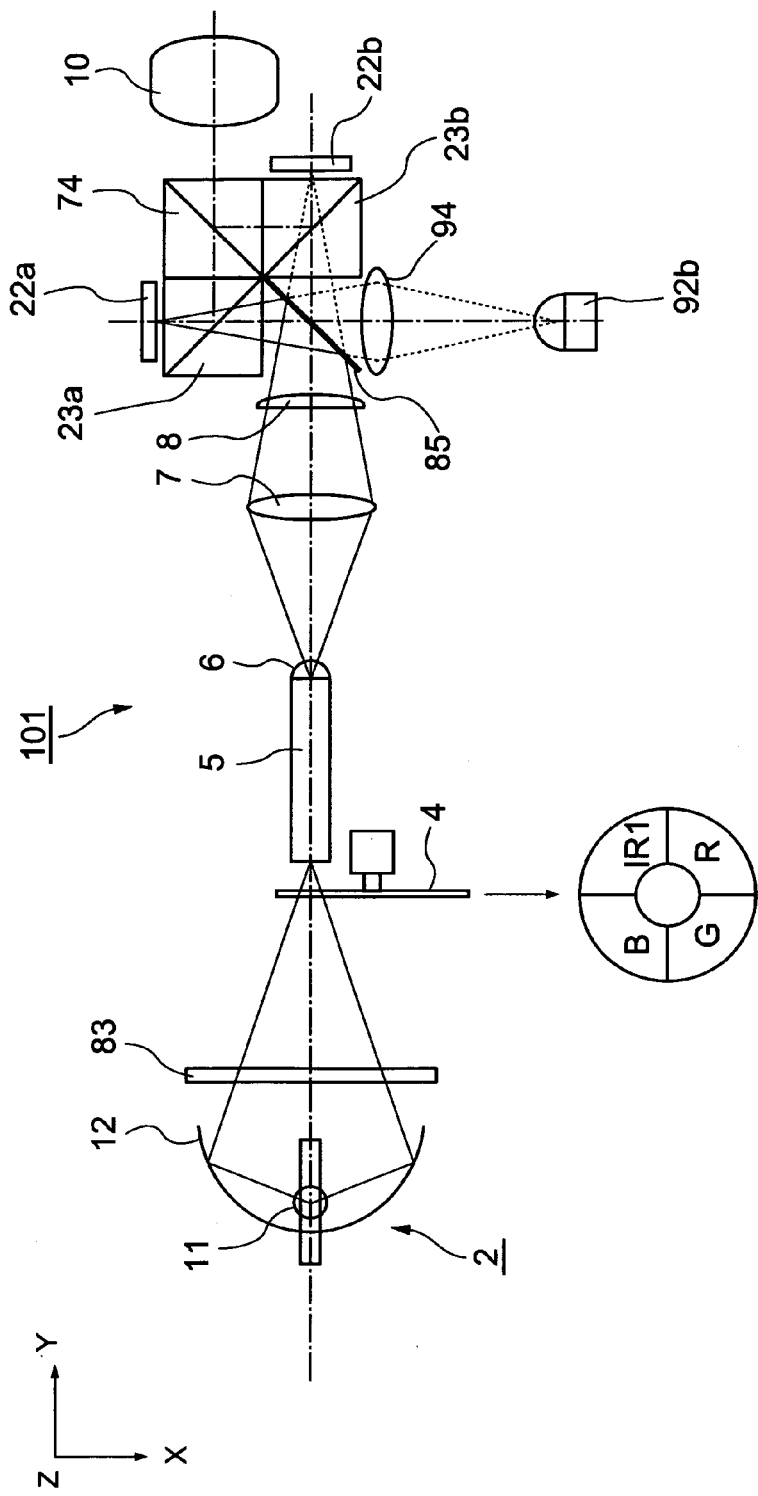
FIG. 14 schematically illustrates a structure of a projector according to a tenth, of the invention.

FIG. 14 schematically illustrates the projector according to this embodiment in FIG. 14 similar reference numbers are given to components common to that used in the ninth embodiment shown in FIG. 13, and detailed explanation of those components is not repeated.

As illustrated in FIG. 14, a projector 101 according to this embodiment has the first light source 2 having wide emission wavelength range (similar to that of the projector in the first embodiment), and the light source for infrared light 92b (second light source). The light source for infrared light 92b may be an LED light source, or a solid light source such as laser, organic EL element, inorganic EL element, and FED. According to this structure, the rotational color filter 4 (light time division separation unit) produces visible lights of B light, G light, and R light, and infrared light of IR1 light having different wavelength ranges from light emitted from the first light source 2. The rotational color filter 4 rotates once in 1/60 second (driven at 60 Hz), and light released substantially every 1/240 second successively changes to different color light in the order of B light, G light, R light, and IR1 light, and returns to B light. Then, the light released from the rotational color filter 4 enters the first liquid crystal light valve 22a. On the other hand, infrared light emitted from the light source for infrared light 92b (IR2 light whose wavelength range does not overlap with that of the IR1 light) separately enters the second liquid crystal light valve 22b. The behaviors of the lights (polarized lights) having entered the first PBS prism 23a, the second PBS prism 23b, and the dichroic prism 74 are similar to those in the eighth embodiments.

Similarly to the above embodiments, the projector 101 according to this embodiment can accurately overlap a visible color image and invisible infrared image on one screen. Thus, the necessity for matching the display positions of the visible image and the infrared image is eliminated, and easiness of use is enhanced. Moreover, the compactness of the display system increases portability of the system. Accordingly, advantages similar to those in the first through ninth embodiments can be offered according to this embodiment.

Generally, the sensitivity of the image shooting element such as CCD and CMOS sensor considerably lowers in the infrared wavelength range longer than 800 nm. Thus, for displaying an infrared image produced by infrared light having long wavelength, it is preferable to include a liquid crystal light valve which uses a dedicated light source emitting infrared light having long wavelength (IR2 light) and separately modulates the infrared light emitted from this light source. In this case, the sensitivity to infrared light having long wavelength easily increases, and thus the infrared image can be securely shot even in the wavelength range where the light sensitivity of the image shooting element considerably lowers. Of course, such a structure may be employed which emits visible light from the first light source and IR1 light from the light source for infrared light.

Eleventh Embodiment

An eleventh embodiment according to the invention is now described with reference to FIG. 15.

The basic structure of a projector according to this embodiment is similar to that of the projector according to the ninth embodiment, but is different in the structures of light source and illumination system.

Figure 15:
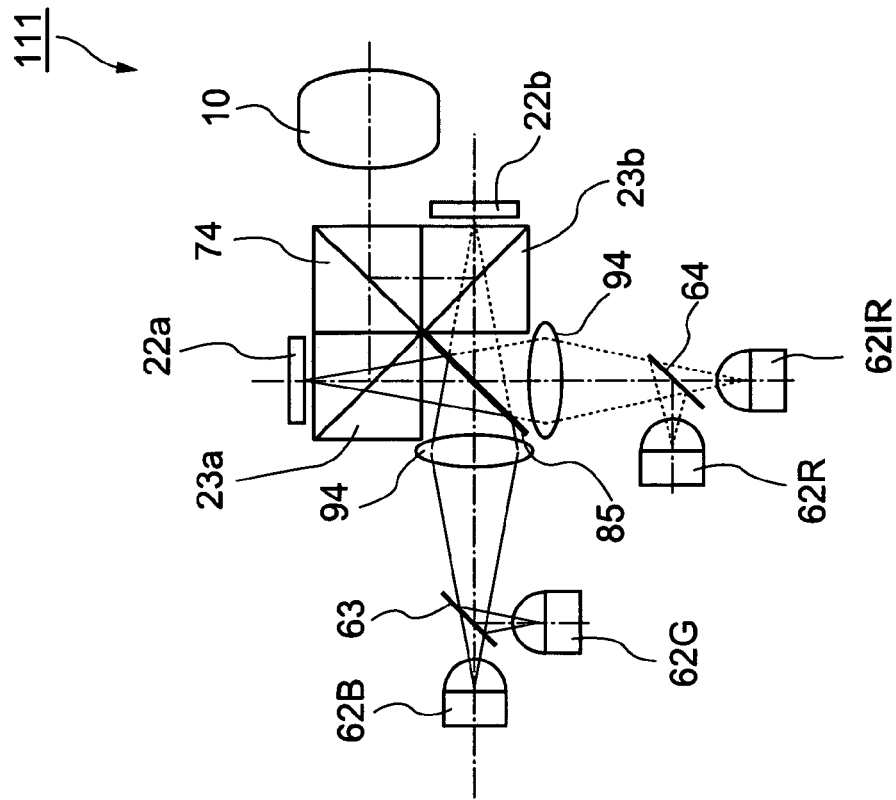
FIG. 15 schematically illustrates a structure of a projector according to an eleventh embodiment of the invention.

FIG. 15 schematically illustrates the projector according to this embodiment. In FIG. 15, similar reference numbers are given to components common to that used in the ninth embodiment shown in FIG. 13, and detailed explanation of those components is not repeated.

As illustrated in FIG. 15, a projector 111 according to this embodiment has the four light sources 62B, 62G, 62R and 62IR having different emission wavelength ranges. These light sources may be LED light sources, or solid light sources such as laser, organic EL element, inorganic EL element, and FED. According to this embodiment, the first dichroic mirror 63 is disposed on the optical Paths of the light emitted from the blue LED light source 61B and the light emitted from the green LED light source 62G. The B light and G light are combined by the first dichroic mirror 63, and the combined light enters the first liquid crystal light valve 22a. The second dichroic mirror 64 is disposed on the optical paths of the light emitted from the red LED light source 62 and the light emitted from the infrared LED light source 62IR. The R light and the IR light are combined by the second dichroic mirror 64, and the combined light enters the second liquid crystal light valve 22b. The behaviors of the lights polarized lights) having entered the first PBS prism 23a, the second PBS prism 23b, and the dichroic prism 74 are similar to those in the eighth embodiment.

Similarly to the above embodiments, the projector 111 according to this embodiment can accurately overlap a visible color image and invisible infrared image on one screen. Thus, the necessity for matching the display positions of the visible image and the infrared image is eliminated, and easiness of use is enhanced. Moreover, the compactness of the display system increases portability of the system. Accordingly, advantages similar to those in the first through tenth embodiments can be offered according to this embodiment.

According to this embodiment, the light sources 62B, 62G, 62R, 62IR having no overlapping emission wavelength range and allowing intermittent lighting are used. Thus, the size of the illumination system can be reduced. Moreover, Since each of the liquid crystal light valves 22a and 22b modulates two types of light, the lighting time of the respective light sources is approximately 1/120 second. In this case, the modulating time of the liquid crystal light valve (image display time) is as long as approximately ¹/₁₂₀ second per sub-frame. Thus, image shooting and image detection by the image shooting element can be easily achieved even in case of low intensity of infrared light emitted from the light source 62IR.

According to the projectors 71, 81, 91, 101, and 111 in the seventh through eleventh embodiments, a plurality of lights having adjoining wavelength ranges are handled by one liquid crystal light valve. Thus, the PBS prism whose band range is narrowed can be a high-performance and low-cost component necessary for the reflection type liquid crystal light valve.

The technical scope of the invention is not limited to those included in the embodiments described herein, and it is therefore intended that various modifications and changes may be made without departing from the scope and spirit of the invention. For example, the color lights are not limited to blue light, green light and red light as in the above embodiments, but may be four lights, for example, according to modifications made for selected applications. The detailed parts are not limited to those of the structures shown. In the respective embodiments, but may be parts appropriately modified. For example, a lens array integrator may be provided as a luminance homogenizing unit in lieu of the rod integrator in the light source emitting side.

The entire disclosure of Japanese Patent Application No. 2007-017504, filed Jan. 29, 2007 is expressly incorporated by reference herein.

What is claimed is:

1. A projector, comprising:
   a light source which emits light containing visible light and infrared light;
   a light time division unit which divides light emitted from the light source into one or more visible lights having different wavelength ranges and one or more infrared lights having different wavelength ranges in a time-division manner;
   a plurality of light modulation elements, which time-sequentially modulate the plural lights separated by the light time division unit and having different wavelength ranges; and
   a projection unit which projects and displays the light modulated by the light modulation elements on a projection-receiving surface,
   wherein a plurality of images containing a visible image produced by the one or more visible lights and an infrared image produced by the one or more infrared lights are displayed on a same projection receiving surface,
   one of the light modulation elements is an infrared light modulation element, which modulates the infrared light;
   a remaining light modulation element is a visible light modulation element, which modulates the visible light; and
   both the visible light modulation element and the infrared light modulation element have the same image display range size and resolution.

2. A projector, comprising:
   a plurality of light sources having a first light source which emits light containing visible light and a second light source which emits light containing infrared light;
   a light time division unit which divides light emitted from at least either the first light source or the second light source into plural lights having different wavelength ranges in a time-division manner;
   a source light combining unit which spatially combines light emitted from the first light source and light emitted from the second light as combined light;
   a plurality of light modulation elements, which modulate the light combined by the source light combining unit; and
   a projection unit which projects and displays the light modulated by the light modulation elements on a projection-receiving surface,
   wherein a plurality of images containing a visible image produced by the light containing visible light and an infrared image produced by the light containing infrared light are displayed on a same regions of the projection receiving surface,
   one of the light modulation elements is an infrared light modulation element, which modulates the infrared light;
   a remaining light modulation element is a visible light modulation element, which modulates the visible light; and
   both the visible light modulation element and the infrared light modulation element have the same image display range size and resolution.

3. A projector, comprising:
   a plurality of light sources which have a first light source for emitting light containing visible light and a second light source for emitting light containing infrared light such that lights can be time-sequentially emitted from the respective light sources;
   a plurality of light modulation elements, which time-sequentially modulate the plural lights time-sequentially emitted from the first light source and the second light source; and
   a projection unit which projects and displays the light modulated by the light modulation elements on a projection-receiving surface,
   wherein a plurality of images containing a visible image produced by the light containing visible light and an infrared image produced by the light containing infrared light are displayed on a same region of the projection receiving surface,
   one of the plural light modulation elements is a light modulation element for infrared light, which modulates the infrared light;
   a remaining light modulation element of the plural light modulation elements is a light modulation element for visible light, which modulates the visible light; and
   both the light modulation element for infrared light and the light modulation element for visible light have the same image display range size and resolution.

4. A projector, comprising:
   a light source which emits light containing visible light and infrared light;
   a light time division unit which divides light from the light source into plural lights containing one or more visible lights having different wavelength ranges and one or more infrared lights having different wavelength ranges in a time division manner;
   a light space division unit which divides light from the light source into plural lights containing one or more visible lights having different wavelength ranges and one or more infrared lights having different wavelength ranges in a space division manner;
   a plurality of light modulation elements each of which is provided on the corresponding one of the optical paths of the lights divided by the light space division unit to time-sequentially modulate the plural lights divided by the light time division unit;
   a modulation light combining unit which spatially combines the plural lights modulated by the plural light modulation elements into one combined light; and a projection unit which projects and displays the light combined by the modulation light combining unit on a projection receiving surface, wherein a plurality of images containing a visible image produced by the one or more visible lights and an infrared image produced by the one or more infrared lights are displayed on the same projection receiving surface.

5. A projector, comprising:

a plurality of light sources which have a first light source for emitting light containing visible light and a second light source for emitting light containing infrared light;

a light time division unit which divides light from at least either the first light source or the second light source into plural lights having different wavelength ranges in a time division manner;

a plurality of light modulation elements each of which is provided on the corresponding one of the optical paths of the lights emitted from the first light source and the second light source to time-sequentially modulate the plural lights divided by the light time division unit;

a modulation light combining unit which spatially combines the plural lights modulated by the plural light modulation elements into one combined light; and a projection unit which projects and displays the light combined by the modulation light combining unit on a projection receiving surface, wherein a plurality of images containing a visible image produced by the light containing visible light and an infrared image produced by the light containing infrared light are displayed on a same projection receiving surface, one of the plural light modulation elements is a light modulation element for infrared light, which modulates the infrared light;

a remaining light modulation element of the plural light modulation elements is a light modulation element for visible light, which modulates the visible light; and both the light modulation element for infrared light and the light modulation element for visible light have the same image display range size and resolution.

6. A projector, comprising:

a plurality of light sources which have a first light source for emitting light containing visible light and a second light source for emitting light containing infrared light such that the lights are time-sequentially emitted from the respective light sources;

a plurality of light modulation elements which have a first light modulation element for time-sequentially modulating a part of plural lights time-sequentially emitted from the first light source and the second light source, and a second light modulation element for time-sequentially modulating the remaining part of the plural lights;

a modulation light combining unit which spatially combines the plural lights modulated by the plural light modulation elements into one combined light; and a projection unit which projects and displays the light combined by the modulation light combining unit on a projection receiving surface, wherein a plurality of images containing a visible image produced by the light containing visible light and an infrared image produced by the light containing infrared light are displayed on the same projection receiving surface, one of the plural light modulation elements is a light modulation element for infrared light, which modulates the infrared light;

a remaining light modulation element of the plural light modulation elements is a light modulation element for visible light, which modulates the visible light; and both the light modulation element for infrared light and the light modulation element for visible light have the same image display range size and resolution.

7. The projector according to claim 4, wherein:

one of the plural light modulation elements is a light modulation element for infrared light which modulates the infrared light; and the remaining light modulation element of the plural light modulation elements is a light modulation element for visible light which modulates the visible light.

8. The projector according to claim 7, wherein both the light modulation element for infrared light and the light modulation element for visible light have the same image display range size and resolution.

9. The projector according to claim 7, wherein the distance between the light modulation element for visible light and the projection unit is different from the distance between the light modulation element for infrared light and the projection unit.

10. The projector according to claim 7, wherein:

the light modulation element for infrared light has a liquid crystal light valve; and a polarizing element provided on the liquid crystal light valve is a light reflection type polarizing element or a light absorbing type polarizing element containing metal.

11. The projector according to claim 1, wherein the light modulation element has any one of a transmission type liquid crystal light valve, a reflection type liquid crystal light valve, and a small mirror array element.

12. The projector according to claim 1, further comprising a function of displaying a marker which indicates the display condition of the infrared light on the projection receiving surface.

13. The projector according to claim 1, further comprising an indicator which indicates the display condition of the infrared light on the main body of the projector.

* * * * *